United States Patent [19]
Zeidler et al.

[11] Patent Number: 5,514,401
[45] Date of Patent: May 7, 1996

[54] SUPERCRITICAL FLUID EXTRACTION OF CHOLESTEROL FROM LIQUID EGG YOLK

[75] Inventors: Gideon Zeidler, Los Angeles; Gonca Pasin; Annie J. King, both of Davis, all of Calif.

[73] Assignee: The Regents Of The University Of California, Oakland, Calif.

[21] Appl. No.: 88,046

[22] Filed: Jul. 6, 1993

Related U.S. Application Data

[63] Continuation-in-part of Ser. No. 652,530, Feb. 8, 1991, abandoned, which is a continuation-in-part of Ser. No. 495,346, Mar. 19, 1990, abandoned.

[51] Int. Cl.$^6$ .................................................. A23L 1/015
[52] U.S. Cl. ........................ 426/429; 426/475; 426/614
[58] Field of Search .................................... 426/614, 429, 426/424, 425, 431, 437, 475, 478, 480, 490, 492, 495, 519

[56] References Cited

U.S. PATENT DOCUMENTS

| | | | |
|---|---|---|---|
| 3,563,765 | 2/1971 | Melmick | 426/614 |
| 3,717,474 | 2/1973 | Fioriti et al. | 99/113 |
| 3,941,892 | 3/1976 | Glasser et al. | 426/104 |
| 3,958,034 | 5/1976 | Nath et al. | 426/614 |
| 4,103,040 | 7/1978 | Fioriti et al. | 426/614 |
| 4,234,619 | 11/1980 | Yano et al. | 426/614 |
| 4,333,959 | 6/1982 | Bracco et al. | 426/614 |
| 4,877,530 | 10/1989 | Moses | 210/511 |
| 5,061,505 | 10/1991 | Cully et al. | 426/614 |

FOREIGN PATENT DOCUMENTS

| | | |
|---|---|---|
| 004818 | 8/1981 | European Pat. Off. . |
| 9135847 | 1/1983 | Japan . |

OTHER PUBLICATIONS

Stadelman et al. 1977 Egg Science and Technology. 2nd Ed. AVI Publishing Co., Inc., Westport, CT. pp. 69 and 73.
Haberstron et al. 1990 Advances in Applied Biotechnology Series. vol. 12, Gulf Publishing Co., Houston, pp. 277–298.
Froning, G. W., *Advances in Applied Biotechnology Series,* 12:22, pp. 277–288 (1991).
Novak, R., Pasin, G., et al., *Advances in Applied Biotechnology Series,* 12:23, pp. 289–298 (1991).
Decholesterolization of Egg Yolk, *European Patent Application,* Publication No. 0048818, Application No. 81106506.9 (1981).
Supercritical extraction holds promise for cholesterol–free butter, *Food Engineering,* (Feb. 1989).
Extraction of Cholesterol and Other Lipids from Dried Egg Yolk Using Supercritical Carbon Dioxide, *Journal of Food Science,* vol. 55, No. 1, pp. 95–98, (1990).
Solvent Extraction of Lipid Components from Egg Yolk Solids, *JAOCS,* vol. 65, No. 7, pp. 113614 1139, (Jul. 1988).
Low Cholesterol Food Preparation—By Cholesterol Extraction with Supercritical Cabon Dioxide, *Derwent Publications, Ltd., J5 9135–847–A, (1984).*
Egg Uses and Processing Technologies, New Developments, Editors J. S. Sim and S. Nakai, CAB International, (1994) at 115.

Primary Examiner—Anthony J. Weier
Attorney, Agent, or Firm—Hana Dolezalova

[57] ABSTRACT

A method for extraction of cholesterol from untreated yolk with supercritical carbon dioxide. The supercritical carbon dioxide extraction of cholesterol from the liquid egg yolk is performed in the presence or absence of cosolvents or other agents enhancing the cholesterol extraction. All agents are non-toxic and safe for human consumption.

20 Claims, 9 Drawing Sheets

SUPERCRITICAL FLUID EXTRACTION OF CHOLESTEROL FROM LIQUID EGG YOLK

This is a continuation-in-part application of U.S. application Ser. No. 07/652,530 filed Feb. 8, 1991 now abandonded, which is a continuation-in-part of the application 07/495,346, filed on Mar. 19, 1990 now abandoned.

BACKGROUND OF INVENTION

1. Field of Invention

This invention concerns a method for supercritical fluid extraction of cholesterol from untreated liquid egg yolk. In particular, this invention concerns supercritical fluid extraction of cholesterol from the untreated liquid egg yolk containing about 50% moisture using supercritical carbon dioxide solvent with or without addition of co-solvents or other agents to enhance the cholesterol extraction.

2. Related Disclosures

For their high nutrient content, healthy source of protein, good taste, colorfulness, long shelf life, ease of preparation and low cost, eggs are popular in the food industry and with consumers. However, because of the large amount of cholesterol content in egg yolk linked to cardiovascular diseases, egg consumption became restricted with the health-minded population. Since the eggs provide contain large amounts of proteins, phospholipids and other nutrients and are otherwise desirable foodstuff, there is an increased interest in providing eggs or egg products with altogether removed or greatly reduced amounts of cholesterol.

Throughout the years, many attempts were made to remove the large amounts of cholesterol from the untreated egg yolk. These attempts were largely unsuccessful because of the high water content in the egg yolk, which makes such removal impossible. Removal of cholesterol from eggs has been described, for example, in *J.Amer.Oil Chem. Soc.*, 65:1136 (1988), EPO Patent Application EP 488181A1 (1982), and in the U.S. Pat. Nos. 4,234,619, 3,563,765 and 4,333,959. All these patents describe methods for cholesterol extraction from the dry or pre-treated egg yolk using conventional solvents, such as hydrocarbons, chlorinated hydrocarbons and alcohols.

Extraction of cholesterol and fats from dry egg yolk have been described in U.S. Pat. No. 3,563,765. The patent describes a method for production of partially defatted dry egg yolk product. In this patent, the conventional dry egg yolk solid was treated with a solvent, primarily with the non-polar solvent such as hexane, cyclohexane, heptane, tetrachloroethylene, or the like, or with the mixture of these non-polar solvents with the polar solvents such as ethyl alcohol, acetone, dioxane, and other solvents of the same type. The primary disadvantage of this method is that, in view of the fact that many organic solvents have been recently connected with tumorous growth, it is not desirable to use these solvents for food extraction. Because of the residues left in the foods after the solvent extractions, the foods submitted to the organic solvents extractions may be dangerous for human consumption. The cholesterol extraction described in the '765 patent can only be performed on dry egg yolk at temperature between 50° C. to 70° C. where the egg yolk proteins easily denaturated and loose their valuable properties, particularly upon reconstitution of dry egg yolk with water. Both the dry egg yolk and the use of polar solvent for extraction impair the unique characteristics of egg yolk proteins, and change the taste, appearance and texture of egg yolk.

The primary problem associated with removal of cholesterol from liquid egg yolk is the amount of water present in the untreated egg yolk. Natural, untreated egg yolk contains about 50% water and has characteristics of oil-in-water emulsion. Unless the oil-in-water emulsion characteristics are changed by chemical or possibly by mechanical means, it is impossible to extract any meaningful amount of cholesterol from the untreated liquid egg yolk.

An attempt to remove cholesterol from the liquid egg yolk where the oil-in-water emulsion is chemically disturbed is found in U.S. Pat. No. 4,333,959. That patent describes the process of reducing the amount of cholesterol in the egg yolk by reducing the pH of fresh egg yolk to destabilize egg yolk emulsion. In this patent, the pH of the egg yolk is reduced to a value around but not below 3, preferably to pH 4 to 6. The egg yolk is treated with a strong mineral acid. The destabilization is achieved by treating the egg yolk with edible vegetable oil to form a fine dispersion which, upon centrifugation, separates the egg yolk phase from the oil phase. Under this low pH conditions, the substantial amount of cholesterol is extracted into the vegetable oil with which the acidified egg yolk is treated. Similarly to the method described above, the pretreatment of the liquid egg yolk with the acid, particularly with the strong hydrochloric or phosphoric acid, poses a health risk for the public in case that the residues of these acids are not properly removed. The acid treatment also changes the properties of the egg yolk by denaturation of proteins. From a processing standpoint, adjustment of pH prior to cholesterol extraction constitutes an additional step in the process which demands a manpower, and is laborious and costly.

Two representative methods, described above, and other methods described in cited references, possess additional disadvantages. For example, used conventional solvents remove not only cholesterol but also other lipids, such as phospholipids. More importantly, they denature proteins and significantly alter functional properties (appearance, taste, texture) of the extracted egg yolk. Such changes in the properties of the egg yolk are unacceptable to the consumer. For example, phospholipids contribute many desirable properties to the egg yolk and their removal, together with the denaturation of proteins, diminishes the nutritious value of the eggs. The residues of the used conventional solvents used for their removal may cause health problems, a definite concern for consumers. The subsequent separation of cholesterol and egg phospholipids from these solvents is difficult and costly, making these methods not only unhealthy but also uneconomical. Consequently, none of the above published methods for extraction of cholesterol was ever commercially used for removal of cholesterol from the egg yolk.

Because cholesterol was found to be involved in cardiovascular diseases, there is a growing consumer demand for reduced cholesterol products. Because of their otherwise multitudinous desirable properties, eggs are the primary target for such cholesterol reduction.

It would be, therefore, extremely important to have available a method which would effectively remove substantial amounts (at least 55%) of cholesterol from various products, particularly from the eggs, without leaving behind a solvent residue or being otherwise harmful to consumer, without changing the appearance of the product, without having undesirable organoleptic properties which effect the taste of the food, or without being industrially not feasible.

The current invention offers the first such safe, fast and economical method for removal of cholesterol from untreated liquid egg yolk using a supercritical fluid extraction with carbon dioxide in the presence or absence of food grade cosolvents or other naturally occurring additives. The current invention thus provides a potential to remove more than 55% of cholesterol from the eggs using a process which is safe but also economically feasible. The process results in the egg yolk product having completely or substantially removed cholesterol without change of flavor, appearance, nutrient content, texture or other desirable properties.

In recent years, supercritical fluid extraction (SFE) has become an acceptable method for coffee and tea decaffeination, hops extraction, and flavor and spice extract production. Recent research indicates that many other additional commercial applications are likely to become utilized in food industry since the primarily used solvent for supercritical extraction, namely carbon dioxide, is safe, nontoxic, non-reactive, inexpensive, and leaves no residue in the food. The supercritical extraction technology thus provides safer and more economic alternative to produce healthier higher quality foods.

It has been previously shown that SFE can be used to effectively remove considerable amounts of cholesterol and saturated fats contained in butterfat. (*Food Eng.*, 83 (February 1989) and *Cholesterol Removal from Butterfat via Supercritical Fluid Extraction*, AICHE Summer National Meeting, Denver (August 1988).

Cholesterol extraction from dried egg yolk using supercritical carbon dioxide and using carbon dioxide with cosolvents has also been described in, for example, *J. Food Sci,* 55:95 (1990); *Extraction by Supercritical Fluids: New Products for the Food Industry; Present Status of Extraction of Supercritical Fluids of Natural Materials and Development Trends*, AICHE Annual Meeting, Washington, D.C. (November 1988); and in *Analysis of Cholesterol in Egg Yolk by Supercritical Fluid Chromatography*, Pittsburgh Conf. New York (1990).

Additionally, the supercritical extraction of cholesterol and fats from the dry egg yolk with carbon dioxide is described in the Japanese patent JT9135847. The extraction is performed at 30° to 45° C. at the pressure of 130 to 150 atmospheres. However, the primary requirements for the egg yolk to be extracted with this method is that it has to be freeze-dried and has to have a moisture content no larger than 15%. The Japanese patent clearly describes the difficulty connected with extraction of cholesterol from food products having high moisture content, and concludes that it is preferred that the content of the moisture is not more than 2% to 8%.

Until now, and in agreement with Japanese Patent JP9135847, SFE of untreated liquid egg yolk has not been successfully achieved or reported. The problem connected with the cholesterol extraction from liquid yolk is the moisture present in liquid yolk. Intact untreated liquid egg yolk normally contains around 50% of water. The reduced moisture liquid egg yolk has between 1%–49% of moisture. When the moisture is above 15%, the supercritical extraction becomes very difficult if not impossible because the moisture present in the liquid egg yolk interferes with a supercritical fluid extraction technology based on finely balanced solvent phase in the critical state where the extraction of a specific material into the supercritical gas is achieved at conditions, such as temperature and pressure, specific to these material to be extracted.

To a consumer, the dried egg yolk, whether containing cholesterol or not does not replace the natural moist liquid egg yolk. While the reduced cholesterol dried egg yolk can be made liquid by reconstituting it with water, the taste, appearance and texture are forever changed. To a consumer, liquid egg yolk is always preferable to dried yolk. Regardless of how successful the reconstitution is, the reconstituted dried eggs or egg yolks always taste powdery. That feature, combined with a change in egg yolk appearance, results in diminished appeal of the dried eggs or egg yolks for the consumer. Moreover, a process for cholesterol extraction from the dried eggs or egg yolks requires lyophilization and/or spray drying, both of which processes change the egg yolk properties and raise the cost of the product. The process for cholesterol extraction from the liquid yolk, if available, would eliminate the necessity to use lyophilization.

Thus, it would be desirable to have available a method for supercritical extraction of cholesterol from liquid egg yolk which would preserve the integrity of liquid egg yolk properties but eliminate technologically difficult and costly lyophilization and spray drying connected with extraction of cholesterol from dried egg yolk or other unsafe processes connected with extraction of cholesterol from pretreated egg yolk.

It is, therefore, a primary object of this invention to provide a safe, fast and efficient method for removal of cholesterol from liquid egg yolk which method does not change the properties of the egg and is commercially feasible even for the large processing scale.

SUMMARY

One aspect of this invention is a removal of cholesterol from untreated liquid egg yolk using supercritical fluid extraction.

Other aspect of this invention is removal of cholesterol from untreated liquid egg yolk containing about 50% moisture using supercritical extraction with pure carbon dioxide without cosolvent or any other agent used for enhancement of the cholesterol extraction.

Another aspect of this invention is cholesterol removal from untreated liquid egg yolk containing about 50% of moisture by supercritical extraction with carbon dioxide in the presence of lower alcohol cosolvent.

Still another aspect of this invention is the removal of cholesterol from untreated liquid egg yolk containing about 50% moisture by pretreating the liquid egg yolk with edible vegetable oil and submitting the egg yolk/oil mixture to the supercritical fluid extraction with pure carbon dioxide.

Still yet another aspect of this invention is the removal of cholesterol from untreated liquid egg yolk containing about 50% moisture by pretreating the liquid egg yolk with edible vegetable oil and submitting the egg yolk/oil mixture to the supercritical fluid extraction with carbon dioxide in combination with lower alcohol used as a cosolvent.

Still another aspect of this invention is the removal of cholesterol from untreated liquid egg yolk containing about 50% moisture by first pretreating the liquid egg yolk with edible vegetable oil, separating the egg yolk from edible vegetable oil and then treating the egg yolk residue with the supercritical pure carbon dioxide.

Still yet another aspect of this invention is the removal of cholesterol from untreated liquid egg yolk containing about 50% moisture by pretreating the liquid egg yolk with edible vegetable oil, separating the egg yolk and oil and treating the egg yolk residue with the supercritical fluid extraction with carbon dioxide in combination with food grade lower alcohol used as a cosolvent.

DETAILED DESCRIPTION OF INVENTION

Figure 1:
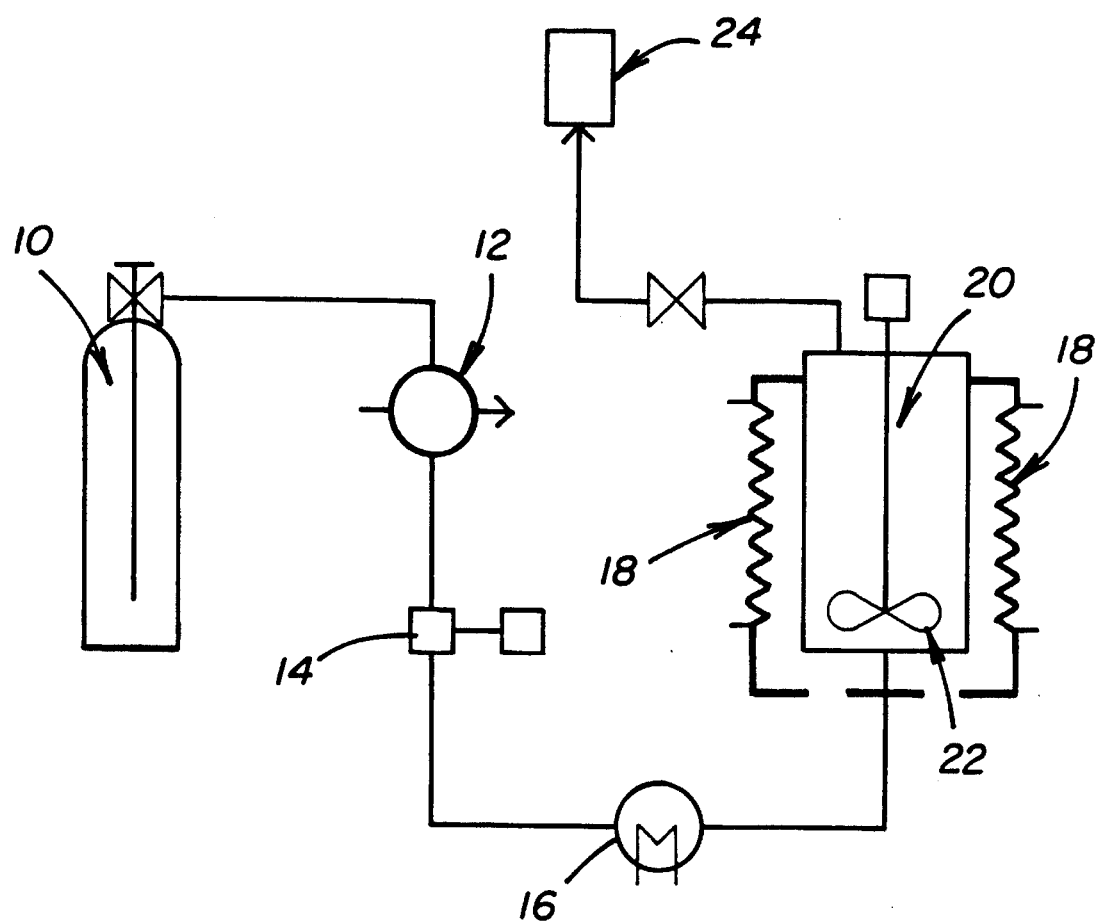
FIG. 1 depicts a supercritical fluid extraction screening unit for measurement of solubility of egg yolk cholesterol.

This invention discloses a method for cholesterol removal from untreated liquid egg yolk by using supercritical fluid extraction with pure carbon dioxide or with carbon dioxide in the presence of food grade lower alcohol cosolvent. The cholesterol extraction yield may be further enhanced by pretreatment of the liquid egg yolk with an edible vegetable oil. The novel and improved method of this invention provides the cholesterol extraction of at least 55%, but typically up to 80%, when a lower alcohol cosolvent is added to supercritical carbon dioxide and up to 90% when the edible vegetable oil is used for extraction of cholesterol from liquid egg yolk before supercritical fluid extraction.

Definitions

As used herein:

"Untreated liquid egg yolk" means the natural intact and untreated liquid egg yolk separated from the egg white, used as is, without any procedure to reduce the moisture. Normally, the intact untreated liquid egg yolk has approximately about 50% of moisture and pH around 6.0–6.6.

"Reduced moisture liquid egg yolk" means the natural egg yolk separated from the egg white which has been submitted to any procedure which reduces its moisture. The reduced moisture liquid egg yolk thus may contain any percentage of moisture from 15%–49%. For experimental purposes the reduced moisture egg yolk was prepared by mixing the intact liquid egg yolk with the proportionate amount of dry egg yolk powder or, in alternative, the reduced moisture liquid egg yolk was prepared by concentration of liquid egg yolk under vacuum. Vacuum evaporators are available in industry for large scale reduction of moisture in the intact liquid egg yolk.

Description of Invention

This invention is based on the physical properties and interactions of certain gasses and liquids vis-a-vis untreated liquid egg yolk. The current invention has three primary variations.

Variation 1

Untreated liquid egg yolk having about 50% moisture was combined with a vegetable oil in a ratio from 1:0.5–4, preferably 1:2, of egg yolk to oil. The mixture of the oil with egg yolk was homogenized under normal pressure and at a temperature between 35°–45° C. to form an emulsion. The emulsion is submitted to supercritical fluid extraction with carbon dioxide alone or, alternatively, with carbon dioxide in the presence of a cosolvent. Using this variation, 60–80% of cholesterol was removed from liquid egg yolk.

Variation 2

Untreated liquid egg yolk having about 50% moisture is combined with a vegetable oil in a ratio from 1:0.5–4, preferably 1:2, of egg yolk to oil. The mixture of the oil with egg yolk is homogenized under normal pressure and at a temperature between 35°–45° C. to form an emulsion. The emulsion is centrifuged, the oil phase and the egg yolk phase are separated and the egg yolk phase is submitted to supercritical fluid extraction with carbon dioxide alone or, alternatively, with carbon dioxide in the presence of a cosolvent. Using this variation, around 56% of the cholesterol was removed from liquid egg yolk. The amount of cholesterol extracted from the liquid egg yolk to the oil was around 46%. An additional 2%–8% was extracted from the residual egg yolk phase.

Variation 3

Untreated liquid egg yolk having about 50% moisture was homogenized under normal atmospheric pressure and the homogenate was submitted to supercritical fluid extraction with carbon dioxide alone, or alternatively, in the presence of a cosolvent. The amount of cholesterol extracted in this variation is between 11%–34%.

Supercritical fluid extraction of various materials depends on interaction of a supercritical gas and a material to be extracted. Supercritical carbon dioxide is known to dissolve both polar and non-polar materials. Polar materials, such as for example, caffeine, are best extracted at about 40% moisture and the extraction may be conducted in water with saturated supercritical carbon dioxide. Non-polar dry materials soluble in solvents, such as hexane, benzene or methylene chloride, can be typically extracted with supercritical carbon dioxide at higher pressures and temperatures. Adding polar solvents such as alcohols or even water, increases polarity of non-polar materials and increases dissolving power of the supercritical carbon dioxide. In case of non-polar lipids, or cholesterol, however, for removal of substantial amounts of these non-polar materials with supercritical carbon dioxide the moisture level must not exceed 15% and should, preferably, be lower than 10%.

The supercritical fluid extraction is based on the premise that a dense gas which is maintained above its critical temperature, the cannot be liquified by pressure. Such gas is called a supercritical fluid. When increasing pressure is applied to any supercritical gas, its density increases and approaches that of a liquid, but its viscosity remains similar to a gas.

Carbon dioxide is the most common supercritical fluid used in the food industry. Carbon dioxide reaches its supercritical state at 31° C. and this feature and its diffusivity makes it adaptable to food systems. The relatively low supercritical temperature is very important for the extraction of cholesterol from the liquid egg yolk. Egg yolk proteins are sensitive to temperature and tend to easily coagulate and denature. Consequently, in order to preserve the integrity of the liquid egg yolk, the low extraction temperature is very important.

The use of carbon dioxide as the supercritical fluid in the current invention is utilized to extract cholesterol from untreated liquid egg yolk.

Determination of a cholesterol solubility in a supercritical gas, discussed in details below, shows that the cholesterol solubility, and in effect the degree of cholesterol extraction, is a function of extraction pressure and temperature. The solubility of cholesterol in the supercritical carbon dioxide increases with increasing pressure and temperature.

Studies described below are intended to illustrate the importance of a pressure, temperature as well as supercritical fluid used for cholesterol extraction. For maximum extraction of cholesterol from the intact untreated liquid egg yolk containing about 50% moisture and having pH above 6.0, the most optimal conditions seem to be the supercritical extraction performed with supercritical carbon dioxide containing 5% methanol or ethanol cosolvent performed at about 2.500–3,500 psig, preferably around 3,000 psig, at 40°–44° C., preferably at 44° C. with a ratio of solvent to feed being 50.

Figure 6:
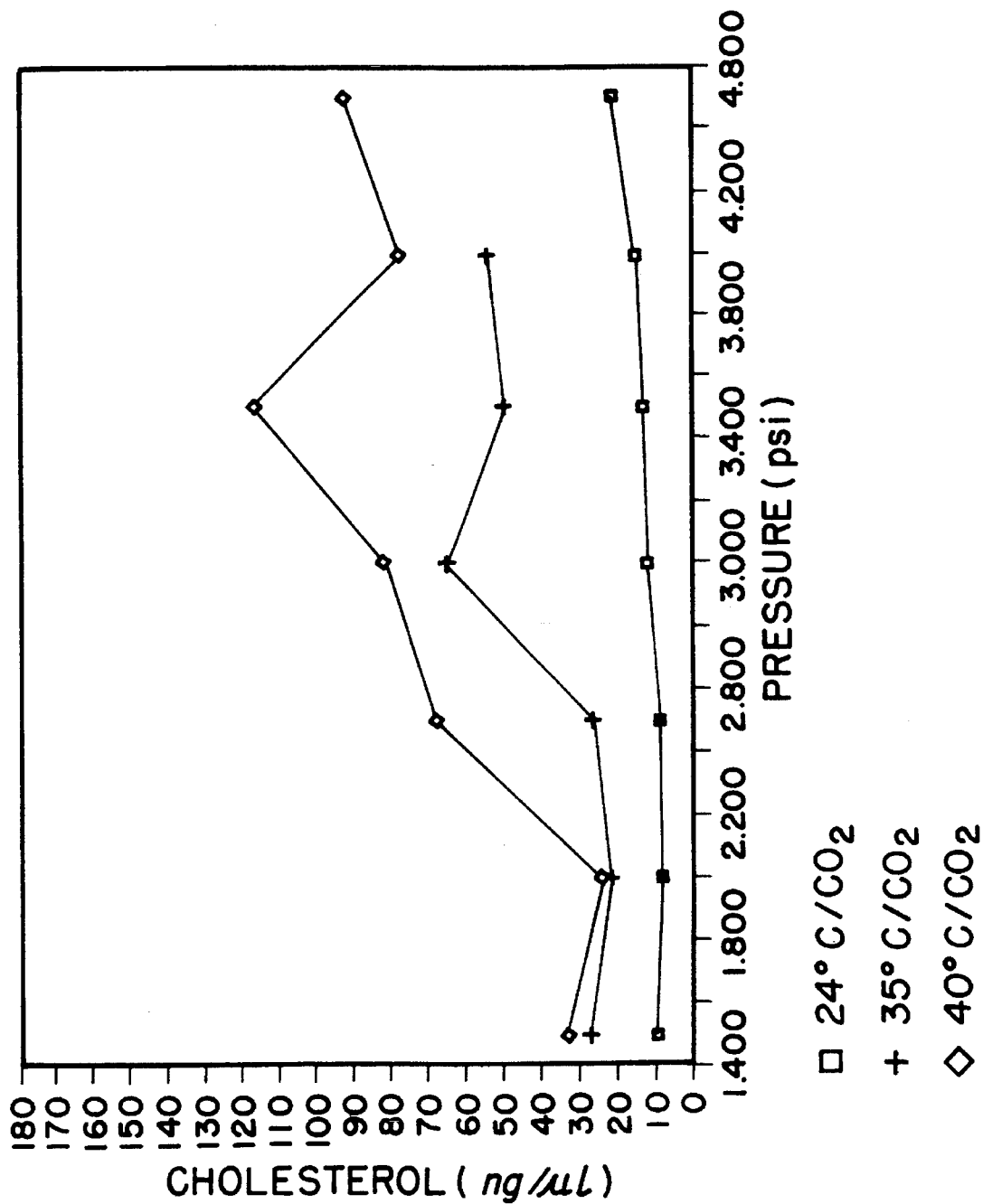
FIG. 6 is a graph showing the dependency of cholesterol solubility on the temperature and pressure in the absence of a cosolvent.
Figure 7:
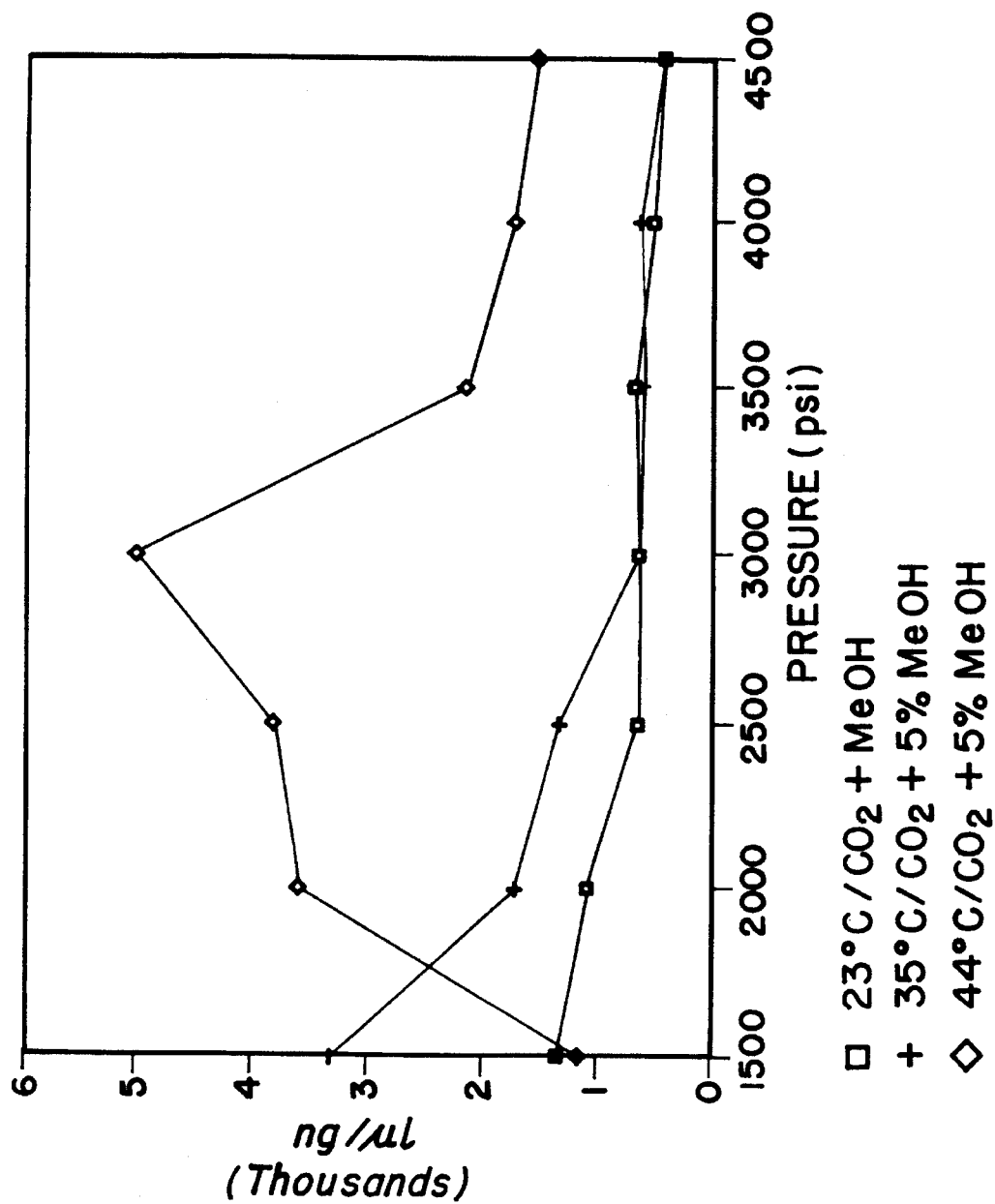
FIG. 7 is a graph showing dependency of a cholesterol solubility in a supercritical fluid on temperature, on the presence of a cosolvent, and on the pressure under which the supercritical extraction is performed.

Extraction pressures applied between 1,500 and 4,500 psig determined that the pressure between 3,000–3,500 psig is the optimal pressure where the solubility of cholesterol levels off. The temperature studies determined that the solubility and extraction of cholesterol from liquid egg yolk are the highest at 35° C. to 40° C. Moreover, solubility of the cholesterol in supercritical carbon dioxide may be increased and even doubled by addition of a small amount, from 1% to 10%, preferably 5%, of low alcohol, such as ethanol or methanol, and maybe further enhanced by addition of about one to four times, preferably twice, the amount of edible vegetable oil. Such enhancement is best introduced and observed at 3,000 psig and at a temperature of 40° C. Solubility of cholesterol from liquid egg yolk in supercritical carbon dioxide may be increased to up to 80–90% when the optimal extraction pressure and temperature are employed and also by addition of the cosolvent and/or edible vegetable oil. A sharp increase in solubility observed at 2,500 psig, was noted over any lower pressure, but solubility increased only slightly at pressures above 3500 psig. The optimal pressure seems to be between 2,500 and 3,500 psig, preferably around 3,000 psig. Solubility of cholesterol was low at subcritical temperature 23° C., increased at 35° C. but was the highest at 40° C. (FIG. 6). An addition of a lower alcohol, such as 5% ethanol, increased cholesterol solubility by a factor of two (FIG. 7). The addition of vegetable oil in ratio 2:1 of oil to egg yolk increased solubility of cholesterol in supercritical carbon dioxide more than twice.

Supercritical extraction of dried egg yolk with carbon dioxide is effective in substantially reducing cholesterol content of the untreated liquid egg yolk, by as much as 75% to 90%. The extraction of cholesterol from untreated liquid egg yolk without the presence of alcohol cosolvent or the edible vegetable oil is much less effective, removing only about 10%–30% of the cholesterol content. The pretreatment of the egg yolk with the edible vegetable oil and/or the addition of the acceptable cosolvent such as food grade alcohol to carbon dioxide, constitutes considerable improvement over any prior available method and up to 80% of cholesterol can be removed from untreated liquid egg yolk.

To increase the percentage of cholesterol extraction, the supercritical extraction process may be repeated twice or several times until the level of extracted cholesterol is satisfactory.

The method for the extraction of cholesterol from the untreated liquid egg yolk having pH above 6.0, preferably 6.3–6.4, is based on cholesterol extraction into the supercritical fluid solvent. The primary supercritical solvent used for supercritical fluid extraction of this invention is carbon dioxide which is safe and accepted for treatment of foods and products for human consumption, and does not leave any residue in the product.

As cosolvents, the food grade lower alcohols, such as, for example, ethanol, propanol, butanol, and other low alcohols, preferably ethanol, are added in amount from 1% to 10%, preferably between 1%–5%.

The extraction of cholesterol from the liquid egg yolk may further be improved by addition of edible vegetable oil added to untreated liquid egg yolk in a ratio from 1:0.5-4, preferably 1:2 (egg yolk/oil).

The edible oils used in the process of the current invention may be any edible vegetable oil which is substantially free of cholesterol, does not contain monoglycerides, acids, etc. and which is either liquid or partially liquid at room temperature. The oil maybe a polyunsaturated oil, partially hydrogenated oil, or an oil which is a mixture of unsaturated and saturated components. Examples of suitable poly-unsaturated vegetable oils are vegetable seed oil, olive oil, corn oil, cotton seed oil, soybean oil, sesame seed oil, sunflower seed oil, safflower seed oil, rice bran oil, grape seed oil, pumpkin or peanut oil, or other vegetable oils, preferably soybean oil.

The process for extraction of cholesterol from untreated liquid egg yolk having pH above 6.0 which is the subject matter of this invention, comprises the solubilization of cholesterol in carbon dioxide at optimal pressure and temperature, in the absence or the presence of a cosolvent, and with or without addition of the vegetable oil to the untreated liquid egg yolk.

There are three variations of the invention, each having two settings. These settings describe the experimental conditions used for determination of the optimal conditions for extraction of the maximal amount of cholesterol from the untreated liquid egg yolk. The apparatus which was used in these studies was a screening unit (FIG. 1) used for screening and determination of solubility of cholesterol extracted from liquid egg yolk. The feasibility unit (FIG. 2) depicts the actual industrial design useful for both the small and large scale process for cholesterol extraction from untreated liquid egg yolk.

Determination of Solubility of Cholesterol

Determination of solubility of egg yolk cholesterol in the supercritical solvent has been done in the standard supercritical screener unit (FIG. 1). Supercritical screener was used to measure the solubility of egg yolk cholesterol in the supercritical solvent under various conditions. This unit was useful for determination of amount of cholesterol which was extracted from each individual batch of liquid egg yolk alone or from the liquid egg yolk/oil mixture.

For each experiment, approximately 100 grams of untreated liquid egg yolk having pH 6.0–6.6 was placed in the extractor which was sealed and purged with carbon dioxide to cooling was necessary in order to prevent cavitation in the pump. The extractor was pressurized using, for example, a packed-plunger reciprocating pump 14. When the lowest desired pressure for extraction was reached, the pump was stopped. Carbon dioxide was then introduced into the extractor 20 from the pump 14. Before reaching the extractor 20, the solvent was pre-heated in the heating element 16. A suitable electrical or other heating mantle 18 was used to maintain the temperature in the extractor.

For solubility experiments, the extractor 20 was held at predetermined experimental conditions, that is at a predetermined temperature and pressure, without flow. The contents, that is liquid egg yolk, solvent, and optionally cosolvent and/or oil, were stirred with a magnetic stirrer 22 at 10–50 rpm, preferably at around 20 rpm, for one to 20 minutes preferably for about two minutes. The stirred content was then allowed to settle for 15–90 minutes, preferably for about 45 minutes. A multiport value 26 was used to introduce a 10 µl sample of the supercritical fluid phase (content of the extractor mixture) directly to supercritical fluid chromatograph 24, such as for example, Hewlett Packard 1082 LC with SFC hardware.

Cholesterol concentration was determined with a 25 cm×4.6 ml ID SUPELCOSIL® LC-CN silica gel column obtained from Supelco Company and measured by UV detection, based on the external standard. Supercritical phase was sampled at least three times for each solubility measurement.

The above equipment and procedure was used solely for optimization of conditions for the process of the cholesterol removal from liquid egg yolk. It was used to determine optimal pressure, temperature, moisture, and the effect of the presence or absence of cosolvent or the edible vegetable oil. The results are shown in FIGS. 3–9 and in Tables 1–3.

Figure 8:
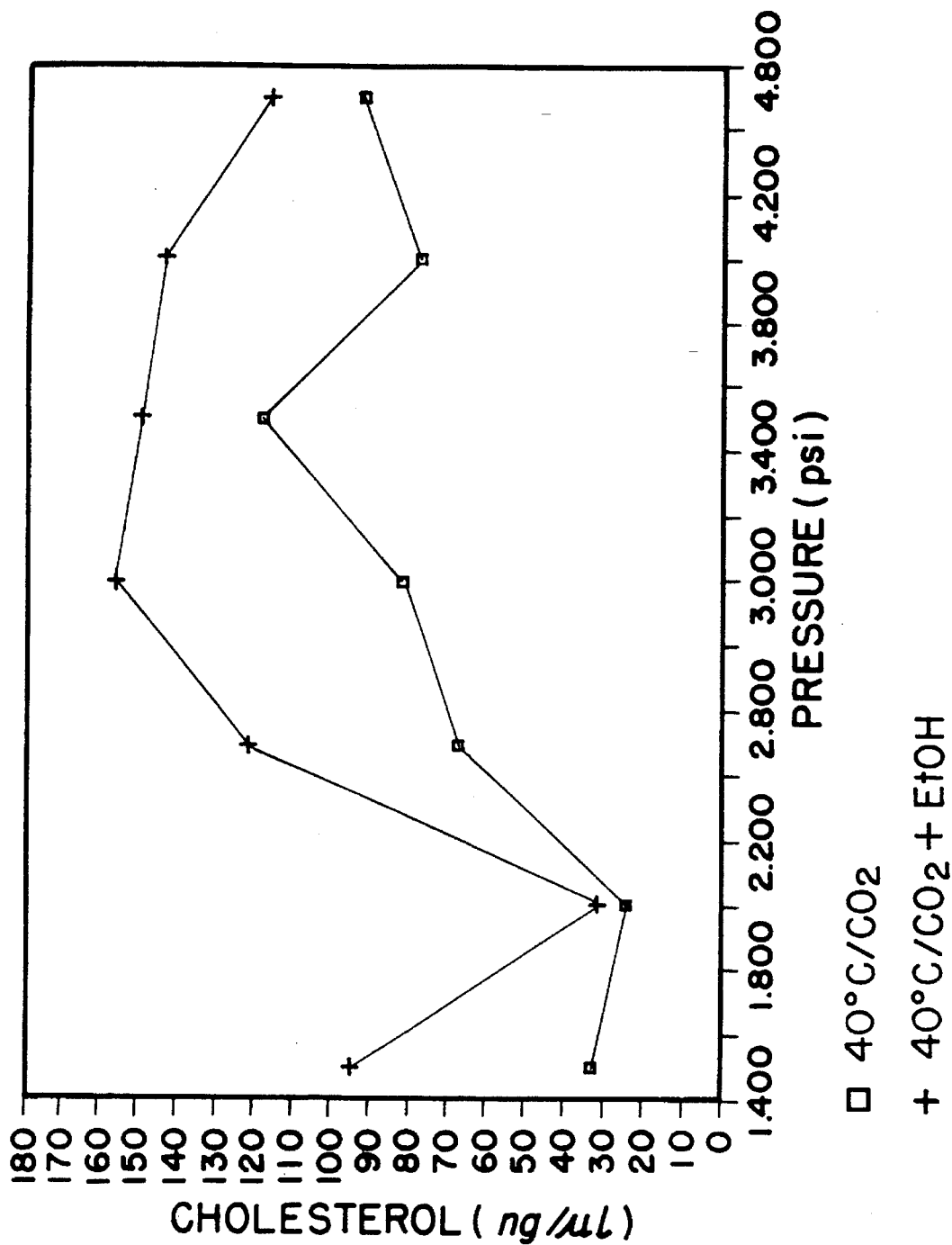
FIG. 8 is a graph showing the dependency of cholesterol solubility in supercritical fluid at 40° C. temperature on the presence or absence of cosolvent and on the pressure under which the supercritical extraction is performed.

Studies performed to determine solubility of cholesterol under various conditions were performed using the supercritical screener unit as described above. Results are illustrated in FIGS. 3–9. Each figure is expressed as a plot of the cholesterol concentration in nanograms per microliter versus the pressure. FIGS. 6 and 8 show cholesterol solubility in supercritical fluid in absolute values. Cholesterol solubility in supercritical solvent expressed in the vapor-liquid equilibrium (VLE), is shown in FIGS. 3–5, 7 and 9. In FIGS. 3–5, 7 and 9, log concentration was plotted as the concentrations achieved in the cosolvent experiments were much higher than those achieved in the pure carbon dioxide experiments.

Effect of Pressure on the Solubility of Cholesterol

The effect of pressure on the solubility of cholesterol and degree of its extraction from the liquid egg yolk in the supercritical solvent is illustrated in FIGS. 3–9. The used pressure was between 1,500 and 4,500 psig.

The effect of pressure on the solubility of cholesterol, expressed in nanogram per microliter in absolute values, is shown in FIGS. 6 and 8, and in log form in FIGS. 3–5, 7 and 9. These figures clearly show that the extraction of cholesterol from the egg yolk/oil mixture sharply increases at around 2,500 psig Depending on the other conditions, the extraction may increase when the pressure, up to 4,500 psig, is used. Generally, the extraction is highest between 3,000 and 3,500 psig As shown in FIG. 6, the solubility of cholesterol in supercritical carbon dioxide depended also on the combination of the pressure with the temperature. At 23° C., the solubility of cholesterol was the lowest but it increased steadily at pressures from about 2,500 psig to 4,500 psig Consequently, at low temperature, the extraction of cholesterol in carbon dioxide increases slowly but steadily with increasing pressure. At temperature 35° C., the extraction of cholesterol increased sharply at pressure around 2,500 psig, reached the highest level at pressure about 3,000 psig, and then declined again to lower levels. At 40° C., the solubility of cholesterol increased at pressure from about 2,000 psig to about 4,500 psig At the peak, cholesterol solubility in supercritical carbon dioxide reached 120 nanograms per microliter at pressure about 3,500 psig. The peak cholesterol extraction at 40° C. was at least two times higher than the cholesterol extraction reached at 35° C. at the same pressure and about 12 times higher than extraction performed at 24° C.

As seen in FIG. 8, however, the addition of cosolvent ethanol to carbon dioxide at the same temperature of 40° C. increased the cholesterol solubility and extraction and reached the peak (around 158 ng/µl) at 3,000 psig pressure. The cholesterol slightly declines at pressure 3,500 psig This shows that the extraction of cholesterol into supercritical fluid is closely dependent on pressure, temperature, and on the presence or absence of the cosolvent. The cosolvent seems to enhance the cholesterol extraction at lower extraction pressure in all variations.

Figure 3:
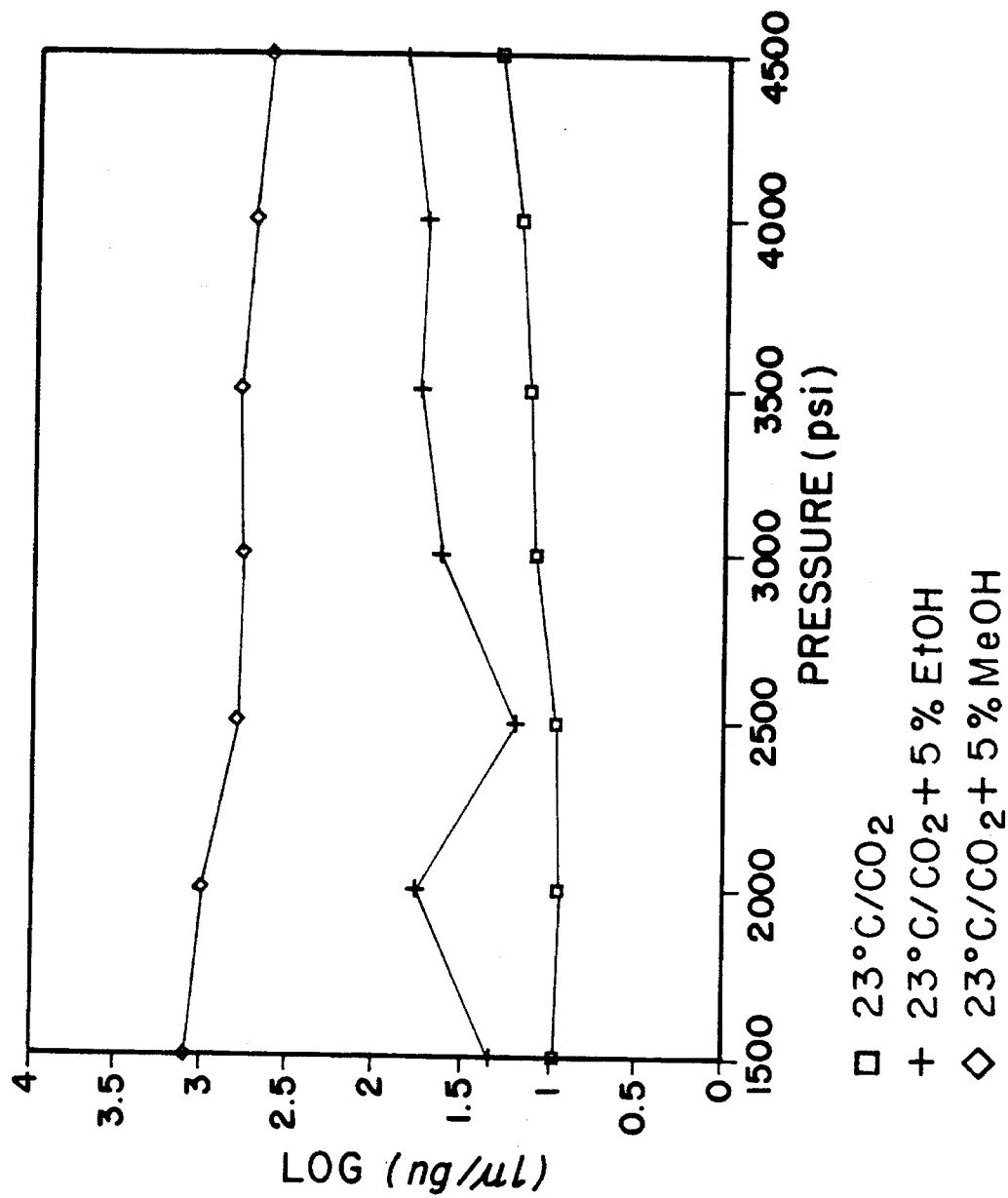
FIG. 3 is a graph showing solubility cholesterol removed from liquid egg yolk in supercritical carbon dioxide solvent for the vapor-liquid equilibrium at 23° C. temperature.

This point is clearly illustrated in FIG. 3 which shows log cholesterol solubility in nanograms per microliters. There, it is clearly seen that when the cholesterol extraction is performed by supercritical extraction with pure carbon dioxide at low temperature of about 23° C., there is a steady increase in cholesterol extraction at pressures between 2,500 and 4,500 psig Carbon dioxide in a mixture with 5% of ethyl alcohol cosolvent sharply increase the cholesterol extraction at about 2,000 psig, then decreased it at 2,500 psig and then it increased the cholesterol extraction steadily between 2,500 and 4,500 psig. At 23° C., carbon dioxide, in combination with methyl alcohol cosolvent, showed the decrease in the extraction with the increasing pressure. Here the highest extraction was observed at 1,500 psig pressure with a steady decline to about 2,500 psig This confirms findings in FIG. 8 that alcohol cosolvent enhances the cholesterol extraction at lower extraction pressures.

FIG. 3 shows that at low temperatures (23° C.), the addition of a cosolvent to the supercritical carbon dioxide substantially increases extraction of cholesterol from the untreated liquid egg yolk.

Figure 4:
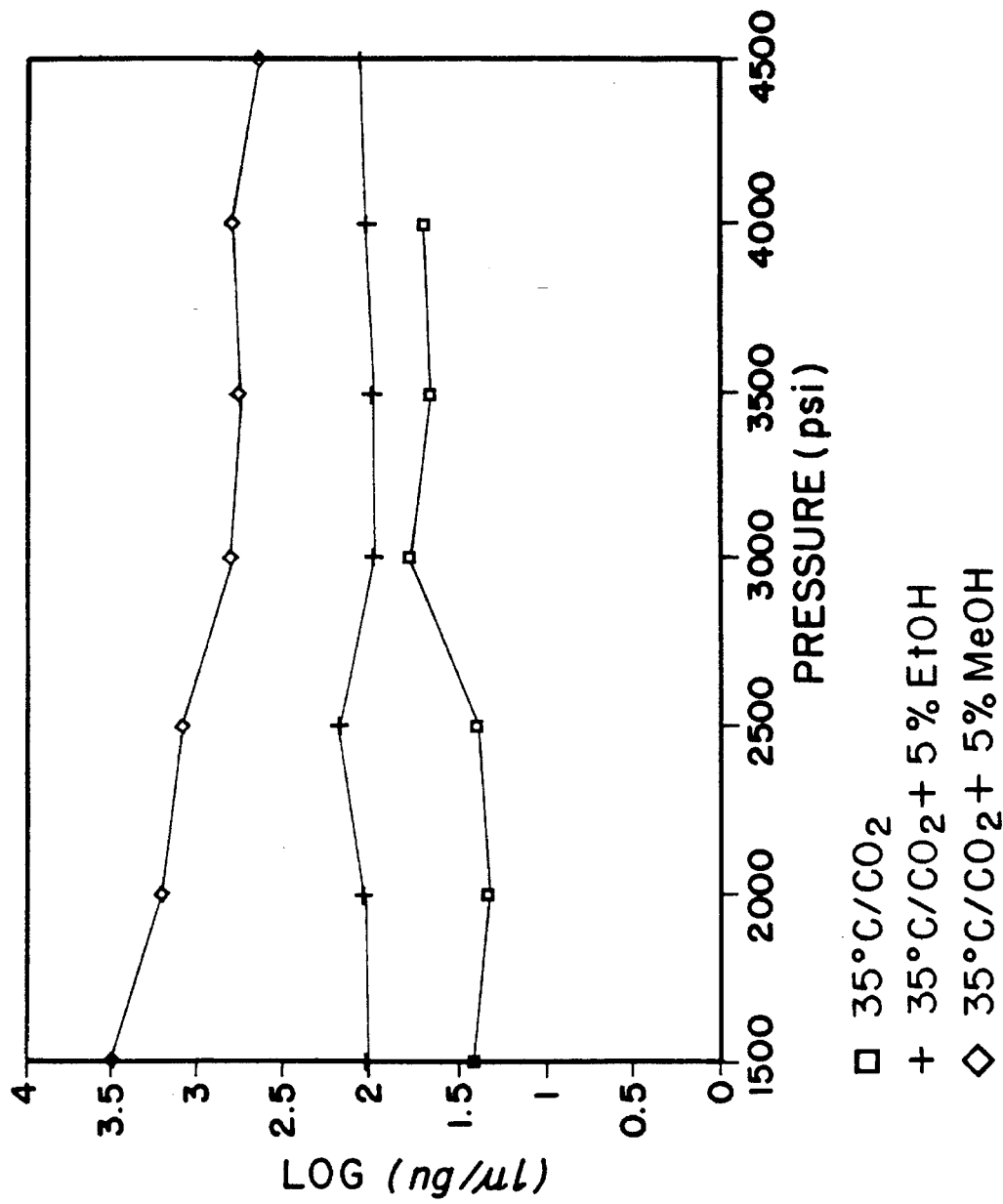
FIG. 4 is a graph showing a dependency of cholesterol extraction on temperature and on the presence of a cosolvent.

FIG. 4 illustrates results obtained under the same experimental conditions as above, that is the determination of the cholesterol extraction with pure carbon dioxide, with carbon dioxide in the presence of 5% ethanol, and with carbon dioxide in the presence of 5% methanol, all of these performed at temperature 35° C. With respect to the pressure at 35° C., the extraction of cholesterol with the pure carbon dioxide pretty much followed the pattern as seen in FIG. 3. The extraction at 35° C. is about one-third higher than that observed at 23° C., and it reaches the peak at pressure around 3,000 psig Cholesterol extraction with carbon dioxide in the presence of ethanol at 35° C. reaches the peak at 2,500 psig and is about one-third higher than the one shown at 23° C. Carbon dioxide extraction in the presence of 5% methanol also follows the same pattern as seen in 23° C. It decreases with the increasing pressure. The decrease under these conditions is much sharper than the one shown at 23° C.

FIG. 4 confirms results shown in FIG. 3. At 35° C., the addition of a cosolvent to the supercritical carbon dioxide substantially increases extraction of cholesterol. However, at this temperature, the cholesterol extraction into the pure supercritical carbon dioxide can be increased by increasing extraction pressure.

Figure 5:
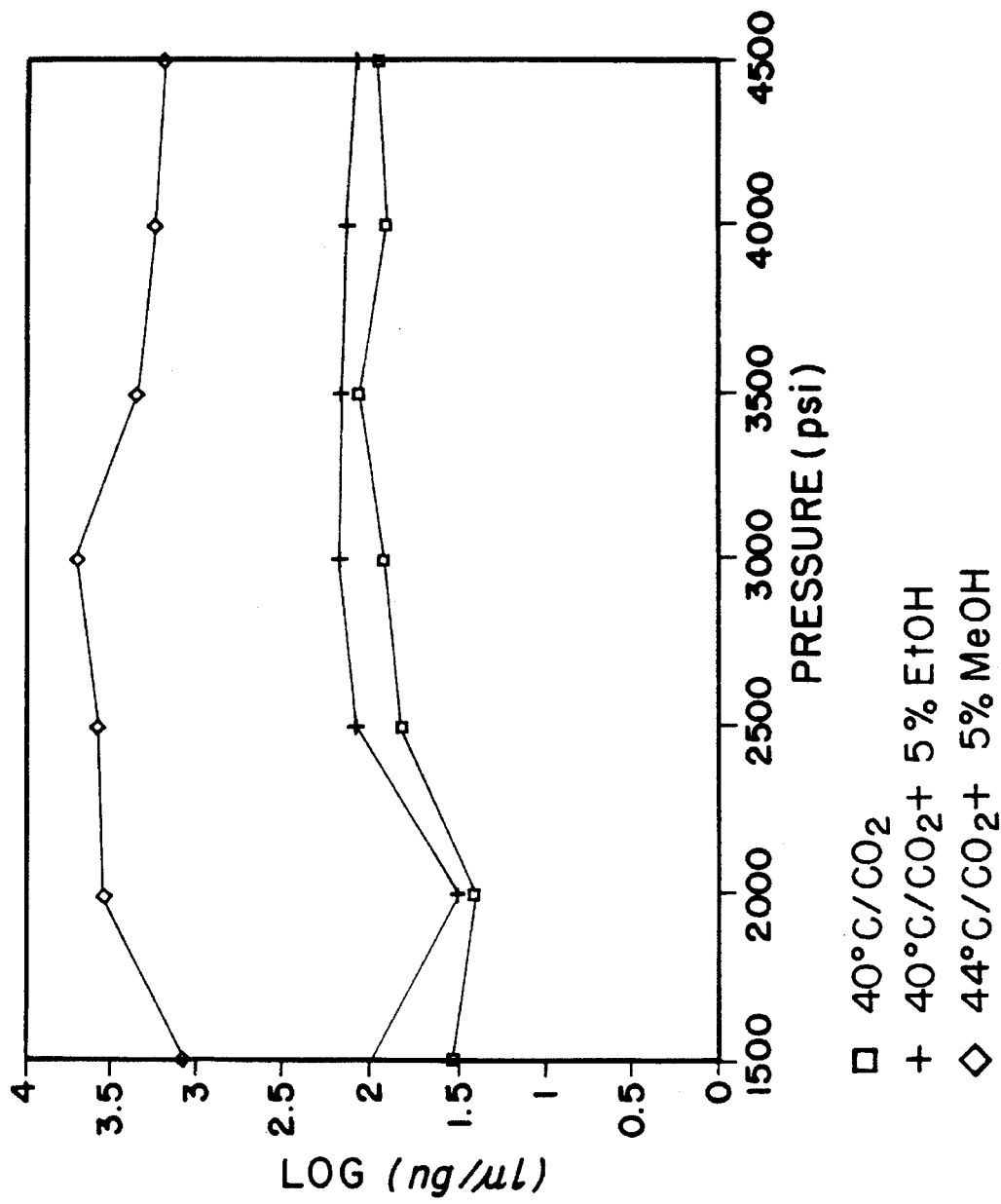
FIG. 5 is a graph showing dependency of cholesterol extraction on temperature and on the presence of a cosolvent.

FIG. 5 illustrates the results obtained under the same experimental conditions, as those described above, that is the cholesterol extraction with pure carbon dioxide, with carbon dioxide in the presence of 5% ethanol at 40° C. or 5% methanol at temperature 44° C. FIG. 5 shows that with increased temperature, at 40° C. the extraction of cholesterol is increased in all three mixtures of supercritical fluids. The pattern for pure carbon dioxide extraction at 40° C. is similar to that seen at temperature 35° C., and so is the pattern, although more pronounced, for the extraction using carbon dioxide with 5% ethanol as cosolvent. The maximum of extraction of cholesterol at these conditions, that is for carbon dioxide with ethanol, reaches the peak at pressure around 3,000 psig The pattern which was seen at temperature 35° C. and 23° C. for carbon dioxide in the presence of methanol, however, was completely changed at 44° C. Contrary to the findings at 23° C. and 35° C., where the extraction of cholesterol with carbon dioxide/methanol mixture decreased with increasing pressure, at 44° C., the sharp increase in the cholesterol extraction was seen already at 2,000 psig The extraction reached its peak at 3,000 psig After 3,000, it declined steadily up to 4,500, and reached the same level as those seen under 1,500 psig FIG. 5 further illustrates the effect of additional cosolvent added to the pure supercritical carbon dioxide. At 40° C., the effect of added 5% ethanol to the supercritical carbon dioxide was not very pronounced. Extraction in both supercritical carbon dioxide and supercritical carbon dioxide containing 5% ethanol could be increased by raising pressure to about 2,500 psig After that, an increase in pressure up to 4,500 psig did not have much effect on the cholesterol extraction.

FIG. 7 shows the extraction of cholesterol with carbon dioxide in the presence of 5% methanol, at different temperatures 23°, 35° and 44° C. The sharp peak of cholesterol extraction at 3,000 psig at 44° C. is very pronounced and so is the decline in the cholesterol extraction observed between 3,000 and 3,500 psig Consequently, the optimal pressure conditions for extraction of cholesterol with carbon dioxide in the presence of methanol as cosolvent would seem to be around 3,000 psig.

FIG. 7 confirms that the most optimal conditions for the extraction of cholesterol by supercritical carbon dioxide are the presence of a cosolvent, temperature around 44° C. and pressure around 3,000 psig.

Effect of Moisture on Solubility of Cholesterol

Figure 9:
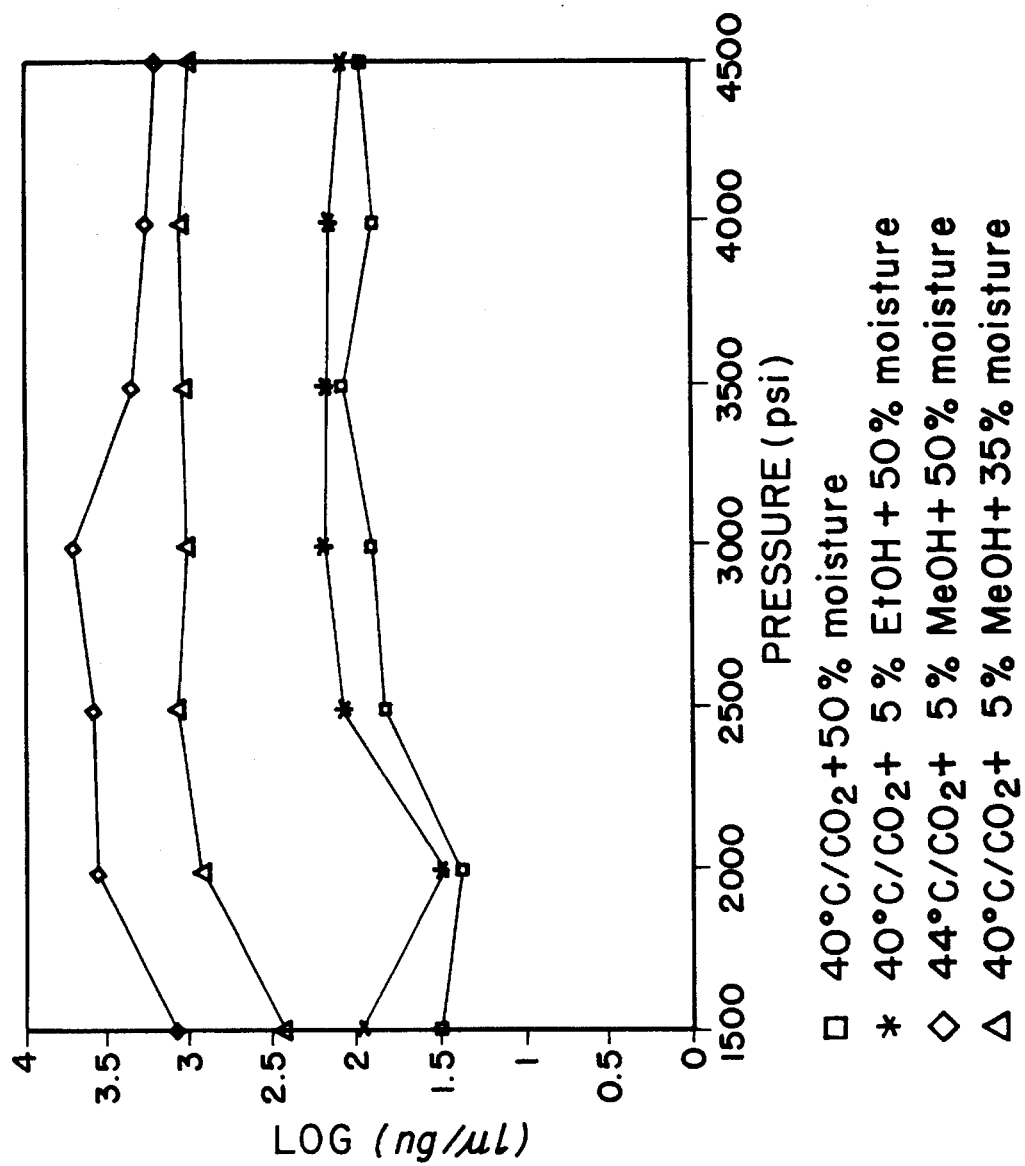
FIG. 9 is a graph showing dependency of cholesterol solubility on temperature, pressure, percentage of moisture and the presence of cosolvent.

The effect of a degree of moisture on the cholesterol extraction by supercritical carbon dioxide is shown in FIG. 9. The moisture in the untreated liquid egg yolk was around 50%. The reduced moisture egg yolk contained 35% moisture.

All experiments illustrated in FIGS. 3–8 were done on the untreated liquid egg yolk where the moisture of the egg yolk was 50%. When extraction of cholesterol by supercritical carbon dioxide in the reduced (35%) moisture egg yolk was followed, it was observed that carbon dioxide in combination with 5% methyl alcohol as a cosolvent, as seen in FIG. 9, increased the solubility of cholesterol. Under these circumstances, cholesterol solubility obtained with pure carbon dioxide or with carbon dioxide with 5% ethanol as a cosolvent was much lower than when methanol was used, and was almost the same or only slightly higher, at 40° C. temperature, than the one observed at 50% moisture with carbon dioxide containing a 5% methanol cosolvent extraction, performed at 44° C.

Thus, the extraction of cholesterol from the liquid egg yolk having 35%, that is decreased moisture content, does not depend on the pressure under which the extraction is performed but the cholesterol extraction rather depends on increased temperature. In other words, it is possible to extract more cholesterol from the reduced moisture liquid egg yolk when the higher temperature is used but not when the higher pressure is used. The pressure thus does not seem to affect the extraction of cholesterol at 40° C. from reduced moisture liquid egg yolk.

Cholesterol extraction from the reduced moisture (35%) liquid egg yolk into supercritical carbon dioxide containing 5% methanol is approximately one-third higher than cholesterol extraction from untreated intact liquid egg yolk having 50% moisture under the comparable pressure 2,500 psig and temperature 40° C. At 44° C., under the otherwise comparable conditions, the cholesterol extraction from untreated liquid egg yolk containing 50% moisture is higher than from the reduced moisture egg yolk.

Effect of Temperature on Solubility of Cholesterol

The effect of temperature on the cholesterol extraction by supercritical fluid is illustrated in FIGS. 3–9. The studied temperature was within limits where the liquid egg yolk does not undergo unwanted changes in consistency, appearance and taste.

FIG. 6 shows cholesterol solubility in absolute numbers in nanograms per microliter at various temperatures. The FIG. 6 clearly illustrates that the extraction of cholesterol from the untreated liquid egg yolk depends on the temperature used for extraction. FIG. 6 shows the supercritical extraction of cholesterol with pure carbon dioxide solvent at three temperatures. At 24° C., the extraction increased only slightly although steadily with increasing pressure. At 35° C., the extraction of cholesterol increases sharply at 3,000 psig to about two times level of that extraction seen at pressure 2,500 psig. At 35° C., the extraction level at 2,500 psig was approximately only 25 to 28 nanogram per microliter while at 3,000 psig, the extraction increases to 65–67 nanogram per microliter. Thus, extraction at 35° C. is directly dependent on the pressure, and it reaches the peak of the cholesterol extraction at around 3,000 psig. At 40° C., the extraction of cholesterol with pure carbon dioxide increases steadily from about 2,000 psig and reaches the peak at 3,500 psig.

Extraction of cholesterol with pure supercritical carbon dioxide depends both on the pressure and on the temperature. The best results are observed with the temperature around 0° C. and at pressure around 3,500 psig.

The effect of temperature on extraction of cholesterol from the liquid egg yolk is further shown in FIGS. 3, 4 and 5. Three different temperature sets were used to illustrate the extraction of cholesterol 1) in pure supercritical carbon dioxide; 2) in supercritical carbon dioxide in the presence of 5% ethanol and 3) in supercritical carbon dioxide in the presence of 5% methanol.

A difference was observed between cholesterol extraction at 23° C. and at 35° and 40° C. extraction with pure carbon dioxide. At 23° C., the cholesterol extraction was approximately one-third lower than the one seen at 35° and 40° C.

The presence of cosolvents at all three temperatures seemed to increase the extractions. There was not much of a difference between 35° and 40° C. extraction for pure supercritical carbon dioxide or pure supercritical carbon dioxide in the presence of 5% ethanol. The only noticeable difference seen in FIGS. 4 and 5 was between the cholesterol extraction with supercritical carbon dioxide in the presence of methanol cosolvent. At the higher 44° C. temperature (FIG. 5), the cholesterol extraction increased with the pressure while at 35° C. (FIG. 4), the cholesterol extraction decreased with the pressure.

The increase in temperature seem to positively affect the extraction of cholesterol by supercritical fluid extraction from the liquid egg yolk.

Effect of Cosolvent on the Cholesterol Extraction from the Liquid Egg Yolk

The effect of the presence of cosolvents such as food grade lower alcohols on the cholesterol extraction by supercritical fluid extraction is shown in FIGS. 3–5 and 7–9 and was already discussed above.

The effect of presence of cosolvent on cholesterol solubility in supercritical fluid is shown in FIG. 8. FIG. 8 compares, at 40° C., the extraction of cholesterol into pure supercritical carbon dioxide, and into supercritical carbon dioxide in the presence of ethanol. As can be seen from the FIG. 8, the presence of ethyl alcohol increases the extraction of cholesterol substantially at pressure at about 3,000 psig. At 40° C., addition of ethyl alcohol cosolvent is responsible for the cholesterol extraction level of about 155 nanograms per microliter, while the cholesterol extraction into pure supercritical carbon dioxide at the same pressure resulted only about 80 nanograms per microliter. The ethanol cosolvent thus increased cholesterol extraction approximately twice.

The effect of the presence of cosolvent on the cholesterol extraction from the untreated liquid egg yolk having 50% of moisture is further illustrated in FIGS. 39 4, 5, 7 and 9. In FIG. 3, the extraction of cholesterol into supercritical carbon dioxide in the presence of 5% of methanol cosolvent is clearly superior to the extraction into pure supercritical carbon dioxide. The extraction of cholesterol into the supercritical carbon dioxide containing ethanol as a cosolvent is higher than into the pure supercritical carbon dioxide by about one-third.

In all three FIGS. 3–5, the extraction with supercritical carbon dioxide containing methanol was higher than with supercritical carbon dioxide with or without ethanol.

FIG. 7 compares the effect of temperature on the extraction of carbon dioxide containing methyl alcohol cosolvent. Here, the extraction of cholesterol from the liquid egg yolk clearly shows that the temperature together with the pressure under which the extraction was performed, and also the presence of specific cosolvent, in this case methyl alcohol, are instrumental in the substantial increase of the extraction of cholesterol from the untreated liquid egg yolk substantially. However, it needs to be recognized that the optimal conditions must be first determined and then followed, in order to maximize the cholesterol extraction. Thus, for example, the cholesterol extraction at 44° C. is highest at 3,000 psig pressure in the presence of 5% methanol. Since the methanol may not be acceptable for health reasons and the temperature above 60° C. may not be acceptable as it may change the liquid egg yolk properties, the other conditions, such as the use of ethanol as a cosolvent and the use of temperature around 35–40° C. were found to be close to optimal for the maximum cholesterol extraction, keeping in mind the ultimate aim to provide low cholesterol, safe and qualitatively unchanged egg product.

In conclusion, ethanol cosolvent added to supercritical carbon dioxide seems to enhance the extraction of cholesterol from the liquid egg yolk by factor of about two. Methanol cosolvent produces higher enhancement of the extraction of cholesterol into pure carbon dioxide by about 10 to 100 times. Since the aim of this invention is to avoid the use of any solvent or cosolvent which might be unsafe and harmful for human consumption, the toxicity of methanol may limit the choice of this solvent as cosolvent for commercial purposes.

In summary, higher pressures, temperatures and the presence of alcohol cosolvents enhance cholesterol solubility and its extraction from the untreated liquid egg yolk.

Cholesterol Extraction from Untreated Liquid Egg Yolk

Figure 2:
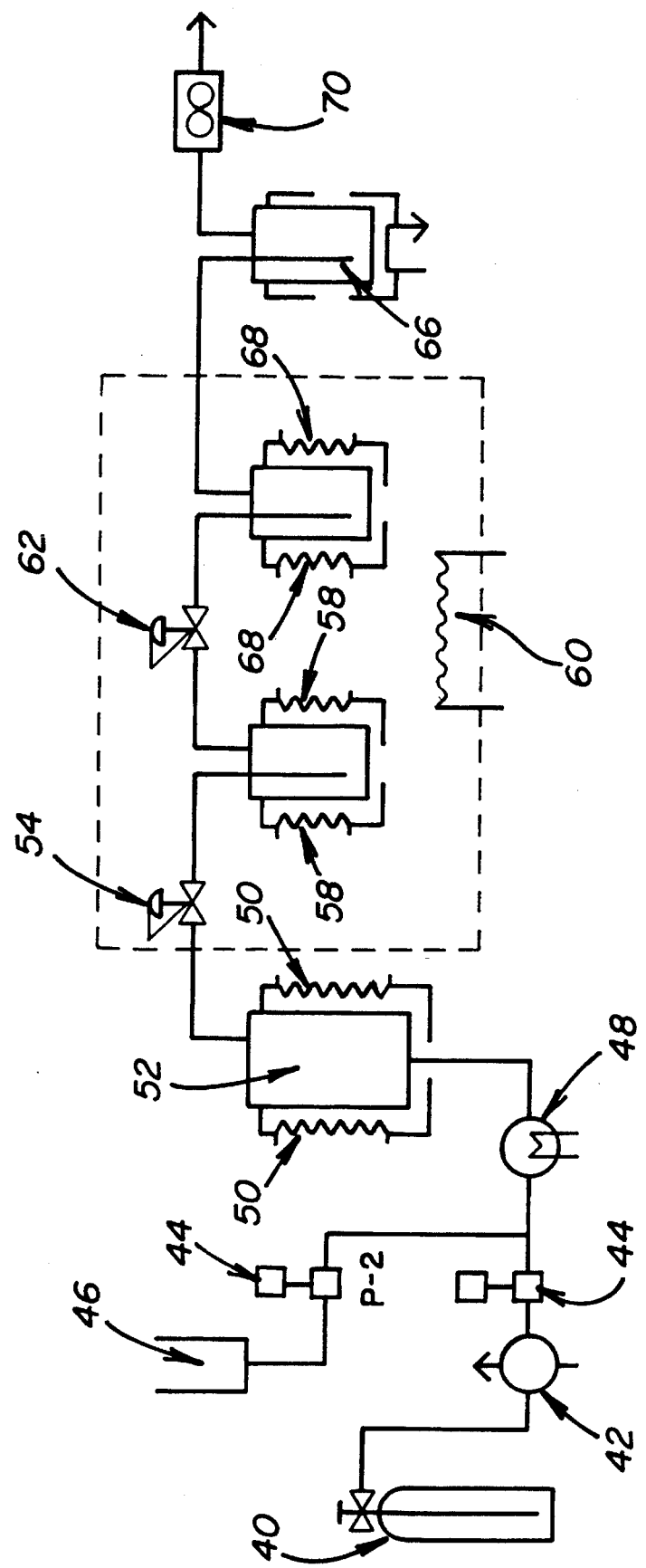
FIG. 2 depicts the supercritical fluid extraction feasibility unit for extraction of cholesterol from untreated liquid egg yolk.

Studies leading to development of commercially feasible and practical process for extraction of cholesterol by supercritical fluid extraction from the liquid egg yolk were performed in the feasibility unit shown in FIG. 2.

Isothermal batch extractions from the liquid egg yolk was performed under the same conditions as the extractions from the dried egg yolk which was used as a control. These extractions were conducted in a feasibility unit, which is illustrated in FIG. 2. Feed samples, which were either freeze-dried egg yolk or untreated liquid egg yolk samples having about 50% moisture and pH above 6.0 of about 50 grams or more, were placed in 300 ml extractor 46 which was sealed and purged with carbon dioxide in order to remove air. Samples were then introduced into the extractor vessel 52. Liquid solvent from a dip tube cylinder 40 was subcooled, as described above, preferably with glycol, in the heat exchanger 42, and brought to extraction pressure with the reciprocating, packed-plunger pump 44. The high pressure solvent was pre-heated in an electric heat exchanger 48, and flowed continuously upward through a batch of feed material in the extractor vessel 52. Electric heaters 50 maintained the temperature within extractor 52 and electrically heated pressure control valve 54 was used to control the extraction pressure. Extraction solvent, pure supercritical carbon dioxide was then introduced from the extractor 52 through the pressure control valve 54 which drops the stream pressure to a near atmospheric pressure before it enters the separation vessel 56. The temperature in the separation vessel 56 was maintained with electric heaters 58 at the predetermined temperature. Materials which were dissolved in the solvent were collected in the separator 64. Solvent from the separator 64 was then flowed through a dry ice cold trap 66 and the vented dry test meter 70 was used to measure flow.

The extraction continued until the desired solvent to feed ratio, usually 50, was achieved. At that point, the pump was stopped, the system was depressurized through the separator and the vent and the extracted liquid egg yolk and extracting solvent carbon dioxide were removed and further processed. Cholesterol content was determined in both.

Preparation of Liquid Egg Yolk for Extraction Processing

In practice and for the large scale extraction, grade A, large shelled eggs are separated into egg white and yolk. Liquid egg yolk is used directly for extraction.

For experimental purposes, liquid yolk was prepared from the dry material by reconstitution to certain percentage of moisture with deionized water. The moisture between 35% to 50% was studied in several of these experiments to simulate the moisture of the liquid egg yolk. Intact fresh egg yolk contained about 50% moisture.

The egg yolk, whether dry or liquid was used in two different variations. First, the dry or liquid egg yolk was used for cholesterol extraction with supercritical carbon dioxide solvent without mixing with any additional material (Setting 1). Second, the egg yolk was mixed with a vegetable oil, preferably one part of the liquid yolk to 0.5–4 parts of the vegetable oil, preferably in ratio 1:2 yolk to oil (Settings 2 and 3).

The mixture of oil and the yolk was homogenized at atmospheric pressure using any homogenizer suitable for such purposes, atrpm between 10,000 to 25,000, preferably around 20,000 rpm, for period of 15 to 90 minutes, preferably for around 30 minutes, at temperature lower than 50° C., preferably at 35°–45° C. temperature. Following the homogenization, the mixture was either centrifuged at rpm around 2,000 to 10,000 rpm, preferably 5,000 rpm, for two to 60 minutes, preferably for 10 minutes, at temperature between 18° C. to 30° C., preferably at room temperature or at 25° C. (Setting 3), or used intact for supercritical extraction (Setting 2). All samples were blanketed and kept under nitrogen and refrigerated or frozen after preparation for extraction.

Experimental Setting for Cholesterol Extraction

Three experimental settings were studied, each with two sub-settings.

Setting 1A—Freeze dried or untreated liquid egg yolk was submitted to supercritical extraction with pure carbon dioxide at various temperatures and pressures.

Between 11%–34% of cholesterol was extracted from the liquid egg yolk using this setting. Between 36%–76% of cholesterol was extracted from the dried egg yolk. (Table 1, Groups 2, 18 and Table 2, Groups 13–1).

Setting 1B—Freeze dried or liquid egg yolk was submitted to supercritical extraction with carbon dioxide containing a cosolvent, under various temperatures and pressures. In this setting, the cosolvent, such as food grade alcohol, preferably ethanol or in some instances methanol, was added to carbon dioxide.

Between 46% to 80% of cholesterol was extracted from the untreated liquid egg yolk in this setting, when 1% ethanol was used as the cosolvent. (Table 2, Group 10 and Table 3, Groups 13–2).

Setting 2A—Liquid or freeze dried egg yolk was mixed in a ratio from 1:0.5-4 with edible vegetable oil. The most optimal ratio was found to be one part of egg yolk to two parts of edible oil. The suitable vegetable edible oil was found to be inexpensive soybean oil. The mixture of the egg yolk and oil was homogenized for five to 15 minutes and submitted to supercritical extraction with pure carbon dioxide as sole solvent under various temperatures and pressures.

Around 57% of cholesterol was removed in this setting (Table 2, Group 6).

Setting 2B—Liquid or freeze dried egg yolk was mixed in a ratio from 1:0.5-4 with edible vegetable oil. The most optimal ratio was found to be one part of egg yolk to two parts of edible oil. The suitable vegetable edible oil was found to be inexpensive soybean oil. The mixture of egg yolk and oil was homogenized for five to 15 minutes at 35°–45° C. and submitted to supercritical extraction with pure supercritical carbon dioxide in the presence of a cosolvent, such as food grade alcohol, preferably ethanol or methanol, under various temperatures and pressures.

Up to 60%–85% of cholesterol was extracted in this setting (Table 2, Group 9 and Table 3, Group 13–3).

Setting 3A—Egg yolk, dry or liquid, prepared in the same way as for setting 2A was homogenized, the mixture was centrifuged at 5,000 rpm for 5–15 minutes and then the homogenate was separated into the egg yolk residue phase and the oil phase. The oil phase contained certain percentage of extracted cholesterol. The residue egg yolk was submitted to supercritical extraction with carbon dioxide as solvent under various temperatures and pressures.

In this setting, about 60% of the total cholesterol was extracted, of which 49% of the cholesterol was extracted into the oil (Table 2, Group 7-1 and Group 8-1) and an additional 2%–10% of the cholesterol was extracted into the supercritical fluid from the residue egg yolk (Table 2, Group 7-2 and Group 8-2).

Setting 3B—Egg yolk, dry or liquid, prepared in the same way as for setting 2A, was homogenized, the mixture was centrifuged at 5,000 for 5–15 minutes and the homogenate was separated into the egg yolk residue and into the oil phase. Certain percentage of cholesterol was extracted into the oil phase. The residue egg yolk was submitted to supercritical extraction with carbon dioxide as solvent containing a cosolvent, such as lower alcohol, preferably ethanol or methanol, and the extraction was performed under various pressures and temperatures.

The results obtain in the studies outlined in the settings one though three are summarized in FIGS. 3–9 and in Tables 1 and 2.

Table 1 illustrates the extraction of cholesterol from the liquid egg yolk, reconstituted liquid egg yolk, dry egg yolk and liquid egg yolk/oil mixture. In the liquid or reconstituted liquid egg yolk there was 50% of moisture. The temperature used in these experiments was between 35° C.–60° C. Pressure used was between 3,500 or 4,000 psig. Solvent/feed ratio was 50 for liquid egg yolk and 100 for dry yolk. Time of extraction was between 3.25 and 4.75 hours.

In the experiments shown in Table 1, no cosolvent was added to supercritical carbon dioxide in Groups 1–5. The extraction was done solely with pure carbon dioxide as the supercritical solvent.

As seen from the results summarized in Table 1, the extraction of cholesterol from the untreated liquid yolk (Group 1) could not be determined because the sample solidified following the supercritical extraction and the amount of extracted cholesterol was not measurable in the solidified sample.

The extraction of cholesterol from the intact liquid egg yolk without mixing it with the oil (Group 2) was rather low. Only about 11% of cholesterol was extracted under these conditions. The low percentage of cholesterol removal in Group 2 was caused by the moisture in the yolk. The normal untreated liquid yolk emulsion traps the cholesterol in lipid complexes with the supercritical solvent mainly making contact with the continuous water phase, that is with the moisture present in such untreated liquid egg yolk. The water phase contains only a little cholesterol and the low cholesterol removal is thus not surprising.

The extraction of cholesterol from the dry egg yolk samples, Groups 3 and 4, depended on the pressure and the temperature which was used. At a higher pressure of 4,000 psig and at acceptable temperature 40° C., the extraction reached about 76%. At the lower extraction pressure of 3,000 psig and at high temperature 60° C., the extraction from the dry egg yolk was only 36%. On the other hand, it was possible to extract about 18% of cholesterol from the reconstituted egg yolk (Group 5), containing 50% moisture, at 35° C. and at a lower pressure 3,500 psig, when the extraction time was extended for another 1.5 hour to 4.75 hours against extraction time used for extraction of Group 2 (3.25 hours).

These findings confirm that it is difficult to extract cholesterol from the egg yolk containing more than 15% of moisture.

Table 2 illustrates results obtained with cholesterol supercritical extraction of liquid egg yolk or liquid egg yolk mixed with a vegetable oil and in the presence or absence of ethanol as cosolvent. The extraction was performed either in the liquid egg yolk/oil homogenate (Group 6), or cholesterol was first extracted into the oil and the egg yolk residue was submitted to the extraction with supercritical fluid (Groups 7 and 8). Groups 9 and 10 were extracted with supercritical carbon dioxide containing 1% ethanol.

Liquid egg yolk contained 50% moisture. The extraction was performed at 35° C. at pressure 3,500 psig, having solvent to feed ratio 50. The extraction time was between 2.5–4.5 hours.

Because of the low cholesterol extraction from the untreated liquid egg yolk as is with pure carbon dioxide as supercritical solvent, the liquid egg yolk was mixed with a vegetable oil. In Table 2, Groups 6, 7, 8 and 9 show the results obtained with liquid egg yolk pretreated with edible vegetable oil in a ratio 1:2; yolk:oil. In Group 6, the extraction was performed at 35° C. at the pressure of 3,500 psig for 2.5 hours. Under these conditions, 57% of cholesterol was extracted into pure supercritical carbon dioxide.

This was a substantial improvement over the direct supercritical extraction of the liquid egg yolk without oil addition, as seen in Table 1, Groups 2 and 5 where only 11%–18% of cholesterol was extracted. Regardless whether the natural untreated liquid egg yolk or the reconstituted liquid egg yolk having 50% of the moisture was used, there was the low removal of cholesterol with pure supercritical carbon dioxide, although results in Table 3, Group 13 suggest that up to 34% of cholesterol may be removed under different conditions. The low cholesterol removal, seen in Table 2 was probably a consequence of the thickening and partial solidification of the liquid egg yolk during extraction with pure supercritical carbon dioxide. Such solidification prevented a good contact between egg yolk lipid and oil/gas phase and caused a low extraction of cholesterol from the egg yolk lipid phase.

The experiments were specifically designed where the oil-in-water emulsion was changed to water-in-oil by the addition of oil. It was expected that with the water-in-oil emulsion achieved by the addition of the oil, the supercritical solvent would come in contact with the continuous oil phase where the cholesterol was present and thus, the extraction of cholesterol to the supercritical phase would be increased.

In Table 1, Group 5 where the extended time extraction was done in the reconstituted yolk with 50% moisture at 35° C. temperature and at the pressure 3,500 psig, the extraction was seen to be increased from 11% to 18%, although the extraction pressure was lower than the one used previously. When the same experiment has been performed (Table 2, Group 6) with liquid egg yolk containing 50% moisture to which twice the amount of the edible vegetable oil was added and the cholesterol extraction from the liquid egg yolk/oil homogenate (setting 2A) by the supercritical fluid with pure carbon dioxide was performed at 35° C. at 3,500 psig pressure, 57% of cholesterol was extracted. This was an improvement over the direct supercritical extraction of the egg yolk with pure supercritical carbon dioxide.

In Table 2, Group 7, the liquid yolk was mixed with oil, homogenized, centrifuged and the oil was removed. Only the residue was extracted with supercritical fluid (setting 3A). Under these conditions, 42.3% of cholesterol was removed into the oil prior to supercritical extraction and additional 1.7% was extracted into the supercritical fluid solvent. In Group 7, where the liquid egg yolk was salted using 1%–10% of sodium chloride, the extraction conditions resulted in total extraction of more than 44% of cholesterol. The reason for determining the cholesterol extraction in salted or unsalted fresh liquid yolk was that in the industry there is often a need for adding the salt to the yolk in order to preserve the fresh egg yolk before transportation or for storage and also to prevent a change in texture of the fresh egg yolk upon cold storage.

In the Group 8, where the liquid yolk was unsalted, there was 48.8% of the cholesterol extraction into the oil phase and additional 6.2% was extracted into the supercritical fluid. The experiments in Groups 7 and 8 were performed in the absence of any cosolvent.

In Groups 9 and 10 (Table 2), the cholesterol extraction from the liquid egg yolk (Group 10) or liquid egg yolk mixed with oil in the ratio 1:2 (Group 9) were extracted with carbon dioxide in the presence of 1% ethanol as cosolvent. In both cases, the extraction of cholesterol was larger than in any of the previous comparable groups. For yolk mixed with oil in 1:2 ratio (Group 9), the extraction was 60%, while for liquid egg yolk without oil (Group 10), extraction in carbon dioxide with the presence of ethanol, the extraction of cholesterol was 46%.

Table 3 illustrates supercritical carbon dioxide extraction of dried and liquid egg yolk/oil mixture with pure supercritical carbon dioxide. The extraction conditions are as shown, and the percent of cholesterol removal is also shown. For untreated liquid egg yolk/oil experiments, the removal of cholesterol under the same experimental conditions was measured as removal with pure carbon dioxide (1), carbon dioxide containing 1% of ethanol (2) and egg yolk/oil (1:2) mixture containing 5% ethanol (3).

From Table 3, it is clear only 54% of cholesterol can be removed that from the liquid egg yolk without any treatment using supercritical carbon dioxide extraction. This amount can be increased by mixing with the vegetable oil, as seen before in Table 2, Group 6.

Under the same conditions as seen in Table 3, the extraction performed with pure supercritical carbon dioxide (1), resulted only in the extraction of 54% of cholesterol. When however, 5% alcohol cosolvent was added to the carbon dioxide (2), the extraction of cholesterol increased to 80% (2). When liquid egg yolk was mixed with vegetable oil and the supercritical carbon dioxide contained 5% ethanol, the extraction of cholesterol increased to 85% (3).

Table 4 illustrates the effect of pH on cholesterol extraction from the egg yolk pretreated with edible oil supercritical fluid extraction.

The experiments were done under the following conditions: The pH of liquid egg yolk in one group was adjusted to 5.0, in the other group it was left intact and was higher than pH 6.0. Yolk and oil, in ratio 1:2, were pre-treated by homogenization before being extracted by supercritical carbon dioxide.

The pressure of the supercritical extraction was 3,500 psig, temperature 35° C. with extraction time 2.5 hours.

As seen from the results in Table 4, the cholesterol extraction under these condition did not depend on the pH of the yolk. At pH 5, the cholesterol extraction was on 56.7%, while at the pH 6.0, i.e. in the intact liquid egg yolk the cholesterol extraction was slightly higher 57.7%. The adjustment of pH in this new process is thus not necessary and eliminates steps taken in the prior art.

Large Scale Extraction of Cholesterol from the Liquid Egg Yolk by Supercritical Fluid Extraction The method of extraction of cholesterol from egg yolk using the current invention is commercially feasible and economical for large scale process of cholesterol reduction in untreated liquid egg yolk. The plant capacity is the same or equivalent to a normal processing plant for egg processing, that is approximately 24,000 eggs per hour would be processed. This is the capacity of a large commercial egg-breaking line. When egg yolks are separated from the egg white, they are mixed with two volumes of edible vegetable oil in large homogenizer and homogenized for one hour at slow speed of about 1,500 to 2,000 rpm per hour to prevent the formation of mayonnaise. The homogenate is submitted to supercritical fluid extraction. The extraction pressure is from 2,500 to 4,500 psig, preferably 3,500 psig. The temperature for the most economical and fast removal of cholesterol is between 35° C. and 40° C., preferably around or lower than 35° C., to prevent the denaturation of proteins. The ratio of extraction fluid solvent mixture to feed is 50 to 100. Preferably, there is at least two batch extraction vessels of around 6,000 to 7,000 liters of working volume, both for direct extraction of egg yolk. The equipment is generally as seen in FIG. 2. Moreover, there would be one continuous multistage pack column extractor as seen in the FIG. 1 for extraction of cholesterol from edible oil and for recovery of oil for recycling. Two stages of separation allow separation of low cholesterol egg oils from a high cholesterol by-products streams. The high cholesterol by-products are removed and discarded. Low cholesterol egg oils are returned to the reduced cholesterol egg yolk.

UTILITY

This invention provides a substantial improvement against any previously known extraction method for cholesterol removal from the untreated liquid egg yolk achieved by conventional solvents. The new method is technologically and industrially feasible and economically acceptable with cholesterol extraction from the untreated liquid egg yolk reaching 60% or more. All solvents and oils used for extraction, of cholesterol from egg yolk are either naturally available or accepted as safe food grade solvents. This new and improved method preserves egg yolk properties such as taste, texture and appearance, eliminates demanding technological steps such as freeze drying and is safe, easy, fast and economical.

EXAMPLE 1

MATERIALS AND CONDITIONS FOR THE CHOLESTEROL EXTRACTION FROM LIQUID EGG YOLK

This example illustrates the material preparation, equipment and process conditions used for determination of optimal conditions for cholesterol removal from the liquid egg yolk by supercritical extraction with carbon dioxide.

Dried Egg Yolk: Grade A, large, shell eggs were separated into egg white and yolk. Yolks were freeze-dried. This material was used directly for experiments on dried yolk.

Liquid Egg Yolk: For experiments on untreated liquid egg yolk, the dried material obtained above was reconstituted with 35% or 50% moisture with deionized water. Dried material was used as a reference having known amount of cholesterol upon reconstitution to predetermined moisture percentage.

The Fresh Egg Yolk: The fresh egg yolk was used after separation from the egg white.

Supercritical Solvents: The primary supercritical solvent was commercial grade carbon dioxide having 99.9% purity. Carbon dioxide was obtained in gas dip-tube cylinders from Linde. Cosolvents were 5% of reagent grade ethanol or methanol obtained from Fisher Scientific.

Edible Vegetable Oil: Edible vegetable oil such as safflower, peanut, corn, sunflower, cotton, olive or soybean oil were used for mixing with the liquid egg yolk prior to cholesterol extraction.

Detection Instrument: Detection instrument was 1984 HEWLETT PACKARD 1082LC Super critical fluid chromatograph with SFC Hardware Column: Column was SUPELCOSIL® LC-CN 4.6 mm×25 cm, 5 mm Spherical Silica Detector: Column was Variable Wavelength UV DECTOR® (190 nm-600 nm), ultraviolet light detector Injector: Injector was REHODYNE® Model 7125 Manual Loop Injector, 2 ul Loop

| Extraction and Detection Conditions: | |
| --- | --- |
| Pressure: | 3,000–4,500 psi |
| Temperature: | 20° C.–60° C. |
| Cosolvent: | Ethanol 1%–10%; v/v |
| Mobile Phase: | Carbon dioxide |

EXAMPLE 2

REMOVAL OF CHOLESTEROL FROM UNTREATED LIQUID EGG YOLK

This example illustrates a method for cholesterol removal from the liquid egg by supercritical extraction with pure carbon dioxide containing 1% ethanol cosolvent.

Materials were as prepared or described in the Example 1. Conditions described in Example 1 were used in these experiments.

One hundred grams of the stirred untreated liquid egg yolk having about 50% moisture and above pH 6.0 was introduced into the supercritical fluid extraction apparatus feasibility unit and extraction of cholesterol from the liquid or dry egg yolk was performed as described above.

Enhancement of the cholesterol extraction from the liquid egg yolk was achieved by adding 1% ethanol cosolvent to carbon dioxide.

The extractions were conducted in a feasibility unit, which is illustrated in FIG. 2. Feed sample, i.e. stirred untreated liquid egg yolk (50 grams) was placed in 300 ml extractor 46 which was sealed and purged with carbon dioxide in order to remove air. A sample was then introduced into the extractor vessel 52. Liquid solvent from a dip tube cylinder 40 was subcooled, as described above, preferably with glycol, in the heat exchanger 42 and brought to extraction pressure around 3,000 psig with the reciprocating, packed-plunger pump 44. The carbon dioxide containing 1% ethanol solvent was pre-heated to 35° C. in an electric heat exchanger 48, and flowed continuously upward through a batch of feed material in the extractor vessel 52. The ratio of solvent/feed was about 50. Electric heaters 50 maintained the extractor's 52 temperature and electrically heated pressure control valve 54 was used to control the extraction pressure. Extraction solvent was then flowed from the extractor 52 through the pressure control valve 54 which drops the stream pressure to near atmospheric pressure before it enters the separation vessel 56. The temperature in the separation vessel 56 was maintained with electric heaters 58 at the predetermined temperature of 35° C. Cholesterol which dissolved in carbon dioxide solvent was collected in the separator 64. Solvent (carbon dioxide) from the separator 64 was then flowed through a dry ice cold trap 66 and the vented dry test meter 70 was used to measure flow.

The extraction continued for three hours under the above conditions until the desired amount of cholesterol was extracted. At that point, the pump was stopped, the system was depressurized through the separator and the vent and the liquid egg yolk having reduced cholesterol and extracting solvent were removed and further processed.

Under these conditions, 46% of cholesterol was removed from the untreated liquid egg yolk. Results are shown in Table 2, column 10.

EXAMPLE 3

REMOVAL OF CHOLESTEROL FROM UNTREATED LIQUID EGG YOLK

This example illustrates a method for cholesterol removal from untreated liquid egg yolk with pure supercritical carbon dioxide.

Materials were as described in Example 1. One hundred grams of the stirred untreated egg yolk having 50% moisture and pH around 6.0 was introduced into a feasibility unit of the supercritical fluid extraction apparatus (FIG. 2). The extraction was performed as described in Example 2. Solvent was carbon dioxide; the ratio of solvent/feed was 50; extraction temperature was 50° C.; extraction pressure was 4,000 psig; time of extraction was 3.25 hours. Under these conditions, 1% of the cholesterol was removed, as seen in Table 1, column 2.

EXAMPLE 4

REMOVAL OF CHOLESTEROL FROM UNTREATED LIQUID EGG YOLK/OIL MIXTURE

This example illustrates a method for supercritical fluid extraction of cholesterol from the untreated liquid egg yolk/oil mixture with pure supercritical carbon dioxide.

Used materials were as described in the Example 1 and the method was as described in Example 2.

One hundred grams of the liquid egg yolk having about moisture and around pH 6.3 was mixed with 200 g of soybean oil. The mixture was homogenized for 15 minutes at 20,000 rpm. The homogenate was introduced into the supercritical fluid extraction apparatus, feasibility unit illustrated in FIG. 2 using process steps as described in Example 2.

Mobile phase was 99.9% pure supercritical carbon dioxide; ratio of solvent feed was 50; extraction temperature was 35° C., pressure was 3,500 psig; time of extraction was 2.5 hours.

Under these conditions, 57% of cholesterol was removed, as seen in Table 2, column 6.

EXAMPLE 5

REMOVAL OF CHOLESTEROL FROM UNTREATED LIQUID EGG YOLK/OIL MIXTURE

This example illustrates a method for cholesterol removal from untreated liquid egg yolk/oil mixture with pure supercritical carbon dioxide containing 1% ethanol.

Materials were as described in Example 1. One hundred grams of the stirred untreated egg yolk having 50% moisture and pH above 6.0 was mixed with 200 g of soybean oil, homogenized for 15 minutes at 20,000 rpm and introduced into a feasibility unit of the supercritical fluid extraction apparatus (FIG. 2). The extraction was performed as described in Example 2. Solvent was supercritical carbon dioxide containing 1% ethanol; ratio of solvent/feed was 50; temperature was 35° C.; pressure was 3,500 psig; and extraction time was 4.5 hours.

Under these conditions, 60% of the cholesterol was removed, as seen in Table 2, column 9.

EXAMPLE 6

REMOVAL OF CHOLESTEROL FROM UNTREATED LIQUID EGG YOLK/OIL MIXTURE

This example illustrates a method for cholesterol removal from untreated liquid egg yolk/oil mixture with pure supercritical carbon dioxide.

Materials were as described in Example 1. One hundred grams of the stirred untreated egg yolk having 50% moisture and pH around 6.0 was mixed with 200 g of soybean oil, homogenized at 20,000 rpm for 25 minutes and introduced into a feasibility unit of the supercritical fluid extraction apparatus (FIG. 2). The extraction was performed as described in Example 2. Solvent was pure supercritical carbon dioxide; ratio of solvent/feed was 100; temperature was 35° C.; pressure was 3,500 psig; time of extraction was 3.5 hours.

Under these conditions, 54% of the cholesterol was removed as seen in Table 3, column 13, setting 1.

EXAMPLE 7

REMOVAL OF CHOLESTEROL FROM UNTREATED LIQUID EGG YOLK/OIL MIXTURE

This example illustrates a method for cholesterol removal from untreated liquid egg yolk/oil mixture with supercritical carbon dioxide containing a cosolvent.

Materials were as described in Example 1. One hundred grams of the stirred untreated egg yolk having 50% moisture and pH around 6.0 was mixed with 200 g of soybean oil, homogenized at 20,000 rpm for 25 minutes and introduced into a feasibility unit of the supercritical fluid extraction apparatus (FIG. 2). The extraction was performed as described in Example 2. Solvent was supercritical carbon dioxide containing 1% ethanol; ratio of solvent/feed was 100; temperature was 35° C.; pressure was 3,500 psig; time of extraction was 3.5 hours.

Under these conditions, 80% of the cholesterol was removed as seen in Table 3, column 13, setting 2.

EXAMPLE 8

REMOVAL OF CHOLESTEROL FROM UNTREATED LIQUID EGG YOLK/OIL MIXTURE

This example illustrates a method for cholesterol removal from untreated liquid egg yolk/oil mixture with supercritical carbon dioxide containing a cosolvent.

Materials were as described in Example 1. One hundred grams of the stirred untreated egg yolk having 50% moisture and pH around 6.0 was mixed with 200 g of soybean oil, homogenized at 20,000 rpm for 25 minutes and introduced into a feasibility unit of the supercritical fluid extraction apparatus (FIG. 2). The extraction was performed as described in Example 2. Solvent was supercritical carbon dioxide containing 5% ethanol; ratio of solvent/feed was 100; temperature was 35° C.; pressure was 3,500 psig; time of extraction was 3.5 hours.

Under these conditions, 85% of the cholesterol was removed as seen in Table 3, column 13, setting 3.

TABLE 1

Extraction of Cholesterol from Eggs
(Batch Extraction Data)

| GROUP<br>FEED<br>TYPE | 1<br>LIQUID<br>EGG | 2<br>LIQUID<br>YOLK | 3<br>DRY<br>YOLK | 4<br>DRY<br>YOLK | 5<br>RECON-<br>STITUTED<br>YOLK |
|---|---|---|---|---|---|
| % Moisture | 50% | 50% | 0% | 0% | 50% |
| T, deg. C. | 40 | 50 | 40 | 60 | 35 |
| P, psig | 4,000 | 4,000 | 4,000 | 3,000 | 3,500 |
| Solv/feed | 50 | 50 | 100 | 100 | 50 |
| Time, hrs | 4.25 | 3.25 | 4.25 | 4.25 | 4.75 |
| Cosolvent | — | — | — | — | — |
| Cholesterol % removal | N/M | 11% | 76% | 36% | 18% |

N/M means not measured because sample solidified no analysis was possible.

TABLE 2

| GROUP<br>FEED<br>TYPE | 6<br>YOLK:OIL<br>1:2 | 7<br>YOLK, OIL-<br>EXTRACTED<br>SALTED | 8<br>YOLK, OIL-<br>EXTRACTED<br>UNSALTED | 9<br>YOLK:OIL<br>1:2 | 10<br>LIQUID<br>YOLK |
|---|---|---|---|---|---|
| % Moisture | 50% | 50 | 50 | 50 | 50 |
| T, deg. C. | 35 | 35 | 35 | 35 | 35 |
| P, psig | 3,500 | 3,500 | 3,500 | 3,500 | 3,500 |
| Solv/feed | 50 | 50 | 50 | 50 | 50 |
| Time, hrs | 2.5 | 3.5 | 3 | 4.5 | 3 |
| Cosolvent | — | — | — | 1% ethanol | 1% ethanol |
| % removal | 57% | (1) 42.3%<br>(2) 44.0%<br>1-extr.<br>2-extr.<br>+ SC extr. | (1) 48.8%<br>(2) 55.8%<br>1-extr.<br>2-extr.<br>+ SC extr. | 60% | 46% |

TABLE 3

| GROUP<br>YOLK TYPE | 11<br>DRIED | 12<br>DRIED | 13<br>LIQUID/OIL<br>EGG YOLK |
|---|---|---|---|
| Extraction Conditions | | | |
| Pressure (psi) | 3000 | 4000 | 3500 |
| Temperature (°C.) | 60 | 40 | 35 |
| Solvent/Feed | 100 | 100 | 100 |
| Cosolvent | None | none | none |
| Time | 4.25 | 4.00 | 3.5 |
| Cholesterol Concentration | | | |
| Feed (mg/100 g) | 2144 | 2144 | 1181 |
| Residue (mg/100 g) | 1629 | 862 | 904 |
| Cholesterol removed | | | |
| 1. Carbon dioxide | 37% | 76% | 54% |
| 2. Carbon dioxide + 1% EtOH | | | 80% |
| 3. Carbon dioxide + 5% EtOH | | | 85% |

TABLE 4

| pH of Yolk | Cholesterol Extracted (%) |
|---|---|
| 5.0 | 56.7 |
| 6.0 | 57.7 |

What is claimed is:

1. A method for supercritical fluid extraction of at least 55% of cholesterol by weight from intact untreated liquid egg yolk having about 50% moisture and pH 6.0–6.6, said method comprising steps:

(a) contacting the untreated liquid egg yolk with a vegetable oil in a ratio from 1 volume of egg yolk to 0.5 to 4 volumes of oil;

(b) homogenizing a mixture of step (a) at about 20,000 to 25,000 rpm for about 15–45 minutes;

(c) extracting the homogenate of step (b) with supercritical carbon dioxide at an extraction pressure of between about 2,000 and 4,500 psig and at a temperature between 31° C. and 45° C., having a solvent to feed ratio from 50:1 to 100:1; and (d) separating the liquid egg yolk from the supercritical carbon dioxide containing extracted cholesterol and the vegetable oil used in step (a).

2. The method of claim 1, wherein the vegetable oil is selected from the group consisting of safflower oil, peanut oil, olive oil, corn oil, sunflower oil, cotton oil and soybean oil.

3. The method of claim 2 wherein the vegetable oil is soybean oil.

4. The method of claim 3 wherein the liquid egg yolk and vegetable oil are in ratio 1:2, volume/volume.

5. The method of claim 4 wherein the extraction pressure is from 3,000 to 4,000 psig and temperature is between 35° C. and 40° C.

6. The method of claim 5 wherein the pressure is 3,500 psig and temperature is 35° C.

7. The method of claim 6, wherein the supercritical carbon dioxide additionally contains a cosolvent selected from the group consisting of food grade ethanol, methanol, propanol and a mixture thereof added in amount from 1% to 10%, volume/volume, of cosolvent to solvent.

8. The method of claim 7, wherein the cosolvent is ethanol present in amount from 1% to 5% volume/volume of the cosolvent to the solvent.

9. The method of claim 8, wherein the cosolvent is ethanol added in amount of 1% of volume of the solvent.

10. The method of claim 7, wherein the cosolvent is methanol present in amount from 1% to 10% volume/volume of the cosolvent to the solvent.

11. The method of claim 10, wherein the cosolvent is methanol added in amount of 1% of volume of the solvent.

12. A method for supercritical fluid extraction of at least 55% of cholesterol by weight from intact untreated liquid egg yolk having pH between 6.0 and 6.6 and containing about 50% moisture, said method comprising steps:

(a) contacting the untreated liquid egg yolk with soybean oil in a ratio about 1:2, volume/volume;

(b) homogenizing a mixture of step (a) for about 15–45 minutes at 20,000–25,000 rpm;

(c) extracting the homogenate of step (b) with supercritical carbon dioxide at extraction pressure about 3,500 psig and at temperature between 35° C. and 40° C. having a solvent to feed ratio from 50:1 to 100:1;

(d) repeating step (c) one to five times; and (e) separating the liquid egg yolk from the supercritical carbon dioxide containing extracted cholesterol and the oil used in step (a).

13. The method of claim 12 wherein the supercritical carbon dioxide additionally contains a cosolvent selected from the group consisting of food grade ethanol, methanol, propanol and a mixture thereof added in amount from 1% to 10%, volume/volume, of cosolvent to solvent.

14. The method of claim 13, wherein the cosolvent is ethanol present in amount from 1% to 5% volume/volume of the cosolvent to the solvent.

15. The method of claim 13, wherein the cosolvent is methanol present in amount from 1% to 5% volume/volume of the cosolvent to the solvent.

16. A method for supercritical fluid extraction of at least 55% of cholesterol by weight from intact untreated liquid egg yolk containing about 50% moisture and having pH from 6.0 to 6.6, said method comprising steps:

(a) contacting the untreated liquid egg yolk with soybean oil in a ratio of 1:2 volume/volume;

(b) homogenizing a mixture of step (a) for about 15–45 minutes at 20,000–25,000 rpm;

(c) extracting the homogenate of step (b) with supercritical carbon dioxide containing from 1% to 10% ethanol at extraction pressure about 3,500 psig and at temperature between 35° C. and 40° C. having a solvent to feed ratio of from 50:1 100:1; and (d) separating the liquid egg yolk from the supercritical carbon dioxide containing extracted cholesterol and the vegetable oil used in step (a).

17. The method of claim 16 wherein step (c) is repeated one to five times.

18. A method for supercritical fluid extraction of at least 55% of cholesterol by weight from intact untreated liquid egg yolk containing about 50% moisture and having pH from 6.0 to 6.6, said method comprising steps:

(a) contacting the untreated liquid egg yolk with soybean oil in a ratio of 1:2 volume/volume;

(b) homogenizing a mixture of step (a) for about 15–45 minutes at 20,000–25,000 rpm;

(c) extracting the homogenate of step (b) with supercritical carbon dioxide containing from 1% to 10% of methanol at extraction pressure about 3,500 psig and at temperature between 35° C. and 40° C. having a solvent to feed ratio of from 50:1 to 100:1; and (d) separating the liquid egg yolk from the supercritical carbon dioxide containing cholesterol extracted into the oil.

19. The method of claim 18 wherein step (c) is repeated one to five times.

20. The method of claim 1 wherein the step (c) is repeated one or more times.

* * * * *

UNITED STATES PATENT AND TRADEMARK OFFICE
CERTIFICATE OF CORRECTION

PATENT NO. : 5,514,401
DATED : May 7, 1996
INVENTOR(S) : Gideon Zeidler, et al.

It is certified that error appears in the above-indentified patent and that said Letters Patent is hereby corrected as shown below:

Title Page, Column 2, line 20, change "Cabon" to --Carbon--;

Column 8, line 59, after "dioxide to" insert --remove the air. Liquid carbon dioxide, supplied from a gas cylinder 10, was sub-cooled using any suitable means, preferably with glycol in a heat exchanger element 12--;

Column 10, line 21, insert --.-- between "psig" and "Carbon";

Column 10, line 29, insert --.-- between "psig" and "This";

Column 14, line 56, change "atrpm" to --at rpm--;

Column 21, line 17, change "1%" to --11%--;

Column 21, line 33, insert --50%-- before "moisture".

Signed and Sealed this

Seventeenth Day of September, 1996

Attest:

BRUCE LEHMAN

*Attesting Officer*  *Commissioner of Patents and Trademarks*